US011157688B2

(12) United States Patent
Rutherford et al.

(10) Patent No.: US 11,157,688 B2
(45) Date of Patent: Oct. 26, 2021

(54) ENHANCED INDICATORS FOR IDENTIFYING AFFECTED DATA

(71) Applicant: Microsoft Technology Licensing, LLC, Redmond, WA (US)

(72) Inventors: Allison Jane Rutherford, Seattle, WA (US); Marta Luis Burguete, Seattle, WA (US); Samuel Chow Radakovitz, Puyallup, WA (US); Aaron Lamar Wilson, Seattle, WA (US); Uhl Albert, Eagle, ID (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 735 days.

(21) Appl. No.: 14/213,332

(22) Filed: Mar. 14, 2014

(65) Prior Publication Data

US 2015/0261736 A1    Sep. 17, 2015

(51) Int. Cl.
*G06F 40/18* (2020.01)

(52) U.S. Cl.
CPC .................... *G06F 40/18* (2020.01)

(58) Field of Classification Search
CPC .......................... G06F 17/246; G06F 21/6209
See application file for complete search history.

(56) References Cited

U.S. PATENT DOCUMENTS

| 7,933,862 | B2* | 4/2011 | Chamberlain | ........ | G06F 17/246 |
| | | | | | 707/602 |
| 8,423,909 | B2 | 4/2013 | Zabielski | | |
| 8,510,266 | B1* | 8/2013 | Ho | ........... | G06F 17/246 |
| | | | | | 707/609 |
| 9,092,413 | B1* | 7/2015 | Ho | ........... | G06F 17/246 |
| 2005/0039034 | A1* | 2/2005 | Doyle | ........... | H04L 9/0825 |
| | | | | | 713/193 |
| 2005/0086610 | A1* | 4/2005 | Mackinlay | ........... | G06F 3/048 |
| | | | | | 715/817 |

(Continued)

FOREIGN PATENT DOCUMENTS

EP        1645972 A2    4/2006

OTHER PUBLICATIONS

Anonymous, "Google Apps Experts: How to: Sort, Filter, Merge Cells and Freeze Rows or Columns in Google Sheets," retreived on Jun. 29, 2015 from URL:http://web.archive.org/web/20130927042550/http://blog.ditoweb.com/2013/05/how-to-sort-filter-merge-cells-and.html, 9 pages.

(Continued)

*Primary Examiner* — Alvin H Tan
(74) *Attorney, Agent, or Firm* — Schwegman Lundberg & Woessner, P.A.

(57) ABSTRACT

Technologies are described herein for displaying one or more visual indicators to assist users in identifying cells of a spreadsheet that are affected by an operation. In embodiments disclosed herein, an application is configured to receive a request to perform an operation on at least one cell of the spreadsheet. The application then identifies cells of the spreadsheet that are affected by the operation. The application then displays a visual indicator to emphasize the affected cells. By providing a timely displayed visual indicator that brings attention to affected cells, the user is able to gain a better perspective of the extent of the operation and how the operation applies to the cells of the spreadsheet.

20 Claims, 21 Drawing Sheets

(56) References Cited

U.S. PATENT DOCUMENTS

| | | | |
|---|---|---|---|
| 2006/0015804 A1* | 1/2006 | Barton | G06F 17/246 |
| | | | 715/213 |
| 2008/0276161 A1* | 11/2008 | Slavens | G06F 17/246 |
| | | | 715/213 |
| 2010/0325526 A1 | 12/2010 | Ellis et al. | |
| 2012/0013539 A1 | 1/2012 | Hogan et al. | |
| 2013/0055058 A1* | 2/2013 | Leong | G06F 17/246 |
| | | | 715/219 |
| 2013/0055061 A1 | 2/2013 | Ashley-Rollman et al. | |
| 2013/0160142 A1* | 6/2013 | Lai | G06F 21/6209 |
| | | | 726/28 |

OTHER PUBLICATIONS

"International Search Report & Written Opinion Received for PCT Patent Application No. PCT/US2015/019813", a counterpart application to U.S. Appl. No. 14/213,332, 12 pages.

Roger, Ahuja, "How to use sort and filter using Microsoft Excel 2013," retrieved on Jun. 29, 2015 at URL:https://www.youtube.com/watch?v=04BhOTaCRKQ, 2 pages.

"Filter your data," Published on: Feb. 14, 2014, Available at: https://support.google.com/drive/answer/1229641?hl=en, 3 pp.

Doush et al., "Detecting and Recognizing Tables in Spreadsheets," Published on: Jun. 9, 2010, in Proceedings of the 9th IAPR International Workshop on Document Analysis Systems, 8 pp.

\* cited by examiner

|   | A | B | C | D | E | F | G | H |
|---|---|---|---|---|---|---|---|---|
| 1 | NAME | STATE/ PROVINCE | COUNTRY/REGION | TERRITORY | TERRITORY GROUP | SALES '09 | SALES '10 | |
| 2 | NAME_1 | WASHINGTON | UNITED STATES | NORTHWEST | NORTH AMERICA | 277,042 | 493,251 | 343,251 |
| 3 | NAME_2 | MICHIGAN | UNITED STATES | NORTHEAST | NORTH AMERICA | 654,987 | 455,281 | 345,281 |
| 4 | NAME_3 | UTAH | UNITED STATES | SOUTHWEST | NORTH AMERICA | 289,180 | 365,167 | 365,167 |
| 5 | NAME_4 | MINNESOTA | UNITED STATES | CENTRAL | NORTH AMERICA | 202,346 | 391,750 | 391,750 |
| 6 | NAME_5 | ALBERTA | CANADA | CANADA | NORTH AMERICA | 271,361 | 900,654 | 900,654 |
| 7 | NAME_6 | TENNESSEE | UNITED STATES | SOUTHEAST | NORTH AMERICA | 194,177 | 340,638 | 340,638 |
| 8 | NAME_7 | OREGON | UNITED STATES | NORTHWEST | NORTH AMERICA | 120,252 | 698,876 | 698,876 |
| 9 | NAME_8 | CALIFORNIA | UNITED STATES | SOUTHWEST | NORTH AMERICA | 288,176 | 236,611 | 236,611 |
| 10 | NAME_9 | ONTARIO | CANADA | CANADA | NORTH AMERICA | 233,160 | 472,768 | 472,768 |
| 11 | NAME_10 | WASHINGTON | UNITED STATES | NORTHWEST | NORTH AMERICA | 177,471 | 496,272 | 496,272 |
| 12 | NAME_11 | WASHINGTON | UNITED STATES | NORTHWEST | NORTH AMERICA | 225,642 | 525,591 | 525,591 |
| 13 | NAME_12 | ENGLAND | UNITED KINGDOM | UNITED KINGDOM | EUROPE | 277,891 | 404,937 | 404,937 |
| 14 | NAME_13 | GIRONDE | FRANCE | FRANCE | EUROPE | 281,477 | 300,189 | 300,189 |
| 15 | | | | | | | | |
| 16 | NAME_X | GIRONDE | FRANCE | FRANCE | EUROPE | 323,303 | 200,333 | 343,300 |

FIG. 1

|   | A | B | C | D | E | F | G | H |
|---|---|---|---|---|---|---|---|---|
| 1 | NAME | STATE/ PROVINCE | COUNTRY/REGION | TERRITORY | TERRITORY GROUP | SALES '09 | SALES '10 | |
| 2 | NAME_1 | WASHINGTON | UNITED STATES | NORTHWEST | NORTH AMERICA | 277,042 | 493,251 | 343,251 |
| 3 | NAME_2 | MICHIGAN | UNITED STATES | NORTHEAST | NORTH AMERICA | 654,987 | 455,281 | 455,281 |
| 4 | NAME_3 | UTAH | UNITED STATES | SOUTHWEST | NORTH AMERICA | 289,180 | 365,167 | 365,167 |
| 5 | NAME_4 | MINNESOTA | UNITED STATES | CENTRAL | NORTH AMERICA | 202,346 | 391,750 | 391,750 |
| 6 | NAME_5 | ALBERTA | CANADA | CANADA | NORTH AMERICA | 271,361 | 900,654 | 900,654 |
| 7 | NAME_6 | TENNESSEE | UNITED STATES | SOUTHEAST | NORTH AMERICA | 194,177 | 340,638 | 340,638 |
| 8 | NAME_7 | OREGON | UNITED STATES | NORTHWEST | NORTH AMERICA | 120,252 | 698,876 | 698,876 |
| 9 | NAME_8 | CALIFORNIA | UNITED STATES | SOUTHWEST | NORTH AMERICA | 288,176 | 236,611 | 236,611 |
| 10 | NAME_9 | ONTARIO | CANADA | CANADA | NORTH AMERICA | 233,160 | 472,768 | 472,768 |
| 11 | NAME_10 | WASHINGTON | UNITED STATES | NORTHWEST | NORTH AMERICA | 177,471 | 496,272 | 496,272 |
| 12 | NAME_11 | WASHINGTON | UNITED STATES | NORTHWEST | NORTH AMERICA | 225,642 | 525,591 | 525,591 |
| 13 | NAME_12 | ENGLAND | UNITED KINGDOM | UNITED KINGDOM | EUROPE | 277,891 | 404,937 | 404,937 |
| 14 | NAME_13 | GIRONDE | FRANCE | FRANCE | EUROPE | 281,477 | 300,189 | 300,189 |
| 15 | | | | | | | | |
| 16 | NAME_X | GIRONDE | FRANCE | FRANCE | EUROPE | 323,303 | 200,333 | 343,300 |

FIG. 3A

| | A | B | C | D | E | F | G | H |
|---|---|---|---|---|---|---|---|---|
| 1 | NAME ▽ | STATE/ PROVINCE ▽ | COUNTRY/REGION ▽ | TERRITORY ▽ | TERRITORY GROUP ▽ | SALES '09 ▽ | SALES '10 ▽ | |
| 2 | NAME_1 | WASHINGTON | UNITED STATES | NORTHWEST | NORTH AMERICA | 277,042 | 493,251 | 343,251 |
| 3 | NAME_2 | MICHIGAN | UNITED STATES | NORTHEAST | NORTH AMERICA | 654,987 | 455,281 | 455,281 |
| 4 | NAME_3 | UTAH | UNITED STATES | SOUTHWEST | NORTH AMERICA | 289,180 | 365,167 | 365,167 |
| 5 | NAME_4 | MINNESOTA | UNITED STATES | CENTRAL | NORTH AMERICA | 202,346 | 391,750 | 391,750 |
| 6 | NAME_5 | ALBERTA | CANADA | CANADA | NORTH AMERICA | 271,361 | 900,654 | 900,654 |
| 7 | NAME_6 | TENNESSEE | UNITED STATES | SOUTHEAST | NORTH AMERICA | 194,177 | 340,638 | 340,638 |
| 8 | NAME_7 | OREGON | UNITED STATES | NORTHWEST | NORTH AMERICA | 120,252 | 698,876 | 698,876 |
| 9 | NAME_8 | CALIFORNIA | UNITED STATES | SOUTHWEST | NORTH AMERICA | 288,176 | 236,611 | 236,611 |
| 10 | NAME_9 | ONTARIO | CANADA | CANADA | NORTH AMERICA | 233,160 | 472,768 | 472,768 |
| 11 | NAME_10 | WASHINGTON | UNITED STATES | NORTHWEST | NORTH AMERICA | 177,471 | 496,272 | 496,272 |
| 12 | NAME_11 | WASHINGTON | UNITED STATES | NORTHWEST | NORTH AMERICA | 225,642 | 525,591 | 525,591 |
| 13 | NAME_12 | ENGLAND | UNITED KINGDOM | UNITED KINGDOM | EUROPE | 277,891 | 404,937 | 404,937 |
| 14 | NAME_13 | GIRONDE | FRANCE | FRANCE | EUROPE | 281,477 | 300,189 | 300,189 |
| 15 | | | | | | | | |
| 16 | NAME_X | GIRONDE | FRANCE | FRANCE | EUROPE | 323,303 | 200,333 | 343,300 |

FIG. 3B

|   | A | B | C | D | E | F | G | H |
|---|---|---|---|---|---|---|---|---|
| 1 | NAME | STATE/ PROVINCE | COUNTRY/REGION | TERRITORY | TERRITORY GROUP | SALES '09 | SALES '10 | 343,251 |
| 2 | NAME_1 | MICHIGAN | UNITED STATES | NORTHWEST | NORTH AMERICA | 277,042 | 493,251 | 343,251 |
| 3 | NAME_2 | MICHIGAN | UNITED STATES | NORTHEAST | NORTH AMERICA | 654,987 | 455,281 | 455,281 |
| 4 | NAME_3 | UTAH | UNITED STATES | SOUTHWEST | NORTH AMERICA | 289,180 | 365,167 | 365,167 |
| 5 | NAME_4 | MINNESOTA | UNITED STATES | CENTRAL | NORTH AMERICA | 202,346 | 391,750 | 391,750 |
| 6 | NAME_5 | ALBERTA | CANADA | CANADA | NORTH AMERICA | 271,361 | 900,654 | 900,654 |
| 7 | NAME_6 | TENNESSEE | UNITED STATES | SOUTHEAST | NORTH AMERICA | 194,177 | 340,638 | 340,638 |
| 8 | NAME_7 | OREGON | UNITED STATES | NORTHWEST | NORTH AMERICA | 120,252 | 698,876 | 698,876 |
| 9 | NAME_8 | CALIFORNIA | UNITED STATES | SOUTHWEST | NORTH AMERICA | 288,176 | 236,611 | 236,611 |
| 10 | NAME_9 | ONTARIO | CANADA | CANADA | NORTH AMERICA | 233,160 | 472,768 | 472,768 |
| 11 | NAME_10 | WASHINGTON | UNITED STATES | NORTHWEST | NORTH AMERICA | 177,471 | 496,272 | 496,272 |
| 12 | NAME_11 | WASHINGTON | UNITED STATES | NORTHWEST | NORTH AMERICA | 225,642 | 525,591 | 525,591 |
| 13 | NAME_12 | ENGLAND | UNITED KINGDOM | UNITED KINGDOM | EUROPE | 277,891 | 404,937 | 404,937 |
| 14 | NAME_13 | GIRONDE | FRANCE | FRANCE | EUROPE | 281,477 | 300,189 | 300,189 |
| 15 |   |   |   |   |   |   |   |   |
| 16 | NAME_X | GIRONDE | FRANCE | FRANCE | EUROPE | 323,303 | 200,333 | 343,300 |

*FIG. 3C*

|   | A | B | C | D | E | F | G | H |
|---|---|---|---|---|---|---|---|---|
| 1 | NAME | STATE/ PROVINCE | COUNTRY/REGION | TERRITORY | TERRITORY GROUP | SALES '09 | SALES '10 | |
| 2 | NAME_1 | WASHINGTON | UNITED STATES | NORTHWEST | NORTH AMERICA | 277,042 | 493,251 | 343,251 |
| 3 | NAME_2 | MICHIGAN | UNITED STATES | NORTHEAST | NORTH AMERICA | 654,987 | 455,281 | 455,281 |
| 4 | NAME_3 | UTAH | UNITED STATES | SOUTHWEST | NORTH AMERICA | 289,180 | 365,167 | 365,167 |
| 5 | NAME_4 | MINNESOTA | UNITED STATES | CENTRAL | NORTH AMERICA | 202,346 | 391,750 | 391,750 |
| 6 | NAME_5 | ALBERTA | CANADA | CANADA | NORTH AMERICA | 271,361 | 900,654 | 900,654 |
| 7 | NAME_6 | TENNESSEE | UNITED STATES | SOUTHEAST | NORTH AMERICA | 194,177 | 340,638 | 340,638 |
| 8 | NAME_7 | OREGON | UNITED STATES | NORTHWEST | NORTH AMERICA | 120,252 | 698,876 | 698,876 |
| 9 | NAME_8 | CALIFORNIA | UNITED STATES | SOUTHWEST | NORTH AMERICA | 288,176 | 236,611 | 236,611 |
| 10 | NAME_9 | ONTARIO | CANADA | CANADA | NORTH AMERICA | 233,160 | 472,768 | 472,768 |
| 11 | NAME_10 | WASHINGTON | UNITED STATES | NORTHWEST | NORTH AMERICA | 177,471 | 496,272 | 496,272 |
| 12 | NAME_11 | WASHINGTON | UNITED STATES | NORTHWEST | NORTH AMERICA | 225,642 | 525,591 | 525,591 |
| 13 | NAME_12 | ENGLAND | UNITED KINGDOM | UNITED KINGDOM | EUROPE | 277,891 | 404,937 | 404,937 |
| 14 | NAME_13 | GIRONDE | FRANCE | FRANCE | EUROPE | 281,477 | 300,189 | 300,189 |
| 15 | | | | | | | | |
| 16 | NAME_X | GIRONDE | FRANCE | FRANCE | EUROPE | 323,303 | 200,333 | 343,300 |

*FIG. 4A*

|   | A | B | C | D | E | F | G | H |
|---|---|---|---|---|---|---|---|---|
| 1 | NAME ▽ | STATE/ PROVINCE ▽ | COUNTRY/REGION ▽ | TERRITORY ▽ | TERRITORY GROUP ▽ | SALES '09 ▽ | SALES '10 ▽ | |
| 2 | NAME_1 | WASHINGTON | UNITED STATES | NORTHWEST | NORTH AMERICA | 277,042 | 493,251 | 343,251 |
| 3 | NAME_2 | MICHIGAN | UNITED STATES | NORTHEAST | NORTH AMERICA | 654,987 | 455,281 | 455,281 |
| 4 | NAME_3 | UTAH | UNITED STATES | SOUTHWEST | NORTH AMERICA | 289,180 | 365,167 | 365,167 |
| 5 | NAME_4 | MINNESOTA | UNITED STATES | CENTRAL | NORTH AMERICA | 202,346 | 391,750 | 391,750 |
| 6 | NAME_5 | ALBERTA | CANADA | CANADA | NORTH AMERICA | 271,361 | 900,654 | 900,654 |
| 7 | NAME_6 | TENNESSEE | UNITED STATES | SOUTHEAST | NORTH AMERICA | 194,177 | 340,638 | 340,638 |
| 8 | NAME_7 | OREGON | UNITED STATES | NORTHWEST | NORTH AMERICA | 120,252 | 698,876 | 698,876 |
| 9 | NAME_8 | CALIFORNIA | UNITED STATES | SOUTHWEST | NORTH AMERICA | 288,176 | 236,611 | 236,611 |
| 10 | NAME_9 | ONTARIO | CANADA | CANADA | NORTH AMERICA | 233,160 | 472,768 | 472,768 |
| 11 | NAME_10 | WASHINGTON | UNITED STATES | NORTHWEST | NORTH AMERICA | 177,471 | 496,272 | 496,272 |
| 12 | NAME_11 | WASHINGTON | UNITED STATES | NORTHWEST | NORTH AMERICA | 225,642 | 525,591 | 525,591 |
| 13 | NAME_12 | ENGLAND | UNITED KINGDOM | UNITED KINGDOM | EUROPE | 277,891 | 404,937 | 404,937 |
| 14 | NAME_13 | GIRONDE | FRANCE | FRANCE | EUROPE | 281,477 | 300,189 | 300,189 |
| 15 | | | | | | | | |
| 16 | NAME_X | GIRONDE | FRANCE | FRANCE | EUROPE | 323,303 | 200,333 | 343,300 |

*FIG. 4B*

| | A | B | C | D | E | F | G | H |
|---|---|---|---|---|---|---|---|---|
| 1 | NAME ▽ | STATE/ PROVINCE ▽ | COUNTRY/REGION ▽ | TERRITORY ▽ | TERRITORY GROUP ▽ | SALES '09 ▽ | SALES '10 ▽ | |
| 2 | NAME_1 | WASHINGTON | UNITED STATES | NORTHWEST | NORTH AMERICA | 277,042 | 493,251 | 343,251 |
| 3 | NAME_2 | MICHIGAN | UNITED STATES | NORTHEAST | NORTH AMERICA | 634,987 | 455,281 | 455,281 |
| 4 | NAME_3 | UTAH | UNITED STATES | SOUTHWEST | NORTH AMERICA | 289,180 | 365,167 | 365,167 |
| 5 | NAME_4 | MINNESOTA | UNITED STATES | CENTRAL | NORTH AMERICA | 202,346 | 391,750 | 391,750 |
| 6 | NAME_5 | ALBERTA | CANADA | CANADA | NORTH AMERICA | 271,361 | 900,654 | 900,654 |
| 7 | NAME_6 | TENNESSEE | UNITED STATES | SOUTHEAST | NORTH AMERICA | 194,177 | 340,638 | 340,638 |
| 8 | NAME_7 | OREGON | UNITED STATES | NORTHWEST | NORTH AMERICA | 120,252 | 698,876 | 698,876 |
| 9 | NAME_8 | CALIFORNIA | UNITED STATES | SOUTHWEST | NORTH AMERICA | 288,176 | 236,611 | 236,611 |
| 10 | NAME_9 | ONTARIO | CANADA | CANADA | NORTH AMERICA | 233,160 | 472,768 | 472,768 |
| 11 | NAME_10 | WASHINGTON | UNITED STATES | NORTHWEST | NORTH AMERICA | 177,471 | 496,272 | 496,272 |
| 12 | NAME_11 | WASHINGTON | UNITED STATES | NORTHWEST | NORTH AMERICA | 225,642 | 525,591 | 525,591 |
| 13 | NAME_12 | ENGLAND | UNITED KINGDOM | UNITED KINGDOM | EUROPE | 277,891 | 404,937 | 404,937 |
| 14 | NAME_13 | GIRONDE | FRANCE | FRANCE | EUROPE | 281,477 | 300,189 | 300,189 |
| 15 | | | | | | | | |
| 16 | NAME_X | GIRONDE | FRANCE | FRANCE | EUROPE | 323,303 | 200,333 | 343,300 |

*FIG. 4C*

|   | A | B | C | D | E | F | G | H |
|---|---|---|---|---|---|---|---|---|
| 1 | NAME | STATE/PROVINCE | COUNTRY/REGION | TERRITORY | TERRITORY GROUP | SALES '09 | SALES '10 | |
| 2 | NAME_1 | WASHINGTON | UNITED STATES | NORTHWEST | NORTH AMERICA | 277,042 | 493,251 | 343,251 |
| 3 | NAME_2 | MICHIGAN | UNITED STATES | NORTHEAST | NORTH AMERICA | 634,987 | 455,281 | 455,281 |
| 4 | NAME_3 | UTAH | UNITED STATES | SOUTHWEST | NORTH AMERICA | 289,160 | 365,167 | 365,167 |
| 5 | NAME_4 | MINNESOTA | UNITED STATES | CENTRAL | NORTH AMERICA | 202,346 | 391,750 | 391,750 |
| 6 | NAME_5 | ALBERTA | CANADA | CANADA | NORTH AMERICA | 271,361 | 900,654 | 900,654 |
| 7 | NAME_6 | TENNESSEE | UNITED STATES | SOUTHEAST | NORTH AMERICA | 194,177 | 340,638 | 340,638 |
| 8 | NAME_7 | OREGON | UNITED STATES | NORTHWEST | NORTH AMERICA | 120,252 | 698,876 | 698,876 |
| 9 | NAME_8 | CALIFORNIA | UNITED STATES | SOUTHWEST | NORTH AMERICA | 288,176 | 236,611 | 236,611 |
| 10 | NAME_9 | ONTARIO | CANADA | CANADA | NORTH AMERICA | 222,160 | 472,768 | 472,272 |
| 11 | NAME_10 | WASHINGTON | UNITED STATES | NORTHWEST | NORTH AMERICA | 177,471 | 496,272 | 496,272 |
| 12 | NAME_11 | WASHINGTON | UNITED STATES | NORTHWEST | NORTH AMERICA | 225,642 | 525,591 | 525,591 |
| 13 | NAME_12 | ENGLAND | UNITED KINGDOM | UNITED KINGDOM | EUROPE | 277,891 | 404,937 | 404,937 |
| 14 | NAME_13 | GIRONDE | FRANCE | FRANCE | EUROPE | 284,477 | 300,189 | 300,189 |
| 15 | | | | | | | | |
| 16 | NAME_X | GIRONDE | FRANCE | FRANCE | EUROPE | 323,303 | 200,333 | 343,300 |

FIG. 4D

| | A | B | C | D | E | F | G | H |
|---|---|---|---|---|---|---|---|---|
| 1 | NAME | STATE/PROVINCE | COUNTRY/REGION | TERRITORY | TERRITORY GROUP | SALES '09 | SALES '10 | |
| 2 | NAME_7 | OREGON | UNITED STATES | NORTHWEST | NORTH AMERICA | 120,252 | 698,876 | 343,251 |
| 3 | NAME_10 | WASHINGTON | UNITED STATES | NORTHWEST | NORTH AMERICA | 177,471 | 496,272 | 455,281 |
| 4 | NAME_6 | TENNESSEE | UNITED STATES | SOUTHEAST | NORTH AMERICA | 194,177 | 340,638 | 365,167 |
| 5 | NAME_4 | MINNESOTA | UNITED STATES | CENTRAL | NORTH AMERICA | 202,346 | 391,750 | 391,750 |
| 6 | NAME_11 | WASHINGTON | UNITED STATES | NORTHWEST | NORTH AMERICA | 225,642 | 525,591 | 900,654 |
| 7 | NAME_9 | ONTARIO | CANADA | CANADA | NORTH AMERICA | 233,160 | 472,768 | 340,638 |
| 8 | NAME_5 | ALBERTA | CANADA | CANADA | NORTH AMERICA | 271,361 | 900,654 | 698,876 |
| 9 | NAME_1 | WASHINGTON | UNITED STATES | NORTHWEST | NORTH AMERICA | 277,042 | 493,251 | 236,611 |
| 10 | NAME_12 | ENGLAND | UNITED KINGDOM | UNITED KINGDOM | EUROPE | 277,891 | 404,937 | 472,768 |
| 11 | NAME_13 | GIRONDE | FRANCE | FRANCE | EUROPE | 281,477 | 300,189 | 496,272 |
| 12 | NAME_8 | CALIFORNIA | UNITED STATES | SOUTHWEST | NORTH AMERICA | 288,176 | 236,611 | 525,591 |
| 13 | NAME_3 | UTAH | UNITED STATES | SOUTHWEST | NORTH AMERICA | 289,180 | 365,167 | 404,937 |
| 14 | NAME_2 | MICHIGAN | UNITED STATES | NORTHEAST | NORTH AMERICA | 654,987 | 455,281 | 300,189 |
| 15 | | | | | | | | |
| 16 | NAME_X | GIRONDE | FRANCE | FRANCE | EUROPE | 323,303 | 200,333 | 343,300 |

*FIG. 5A*

|   | A | B | C | D | E | F | G | H |
|---|---|---|---|---|---|---|---|---|
| 1 | NAME | STATE/ PROVINCE | COUNTRY/REGION | TERRITORY | TERRITORY GROUP | SALES '09 | SALES '10 | |
| 2 | NAME_7 | OREGON | UNITED STATES | NORTHWEST | NORTH AMERICA | 120,252 | 698,876 | 343,251 |
| 3 | NAME_10 | WASHINGTON | UNITED STATES | NORTHWEST | NORTH AMERICA | 177,471 | 496,272 | 455,281 |
| 4 | NAME_6 | TENNESSEE | UNITED STATES | SOUTHEAST | NORTH AMERICA | 194,177 | 340,638 | 365,167 |
| 5 | NAME_4 | MINNESOTA | UNITED STATES | CENTRAL | NORTH AMERICA | 202,346 | 391,750 | 391,750 |
| 6 | NAME_11 | WASHINGTON | UNITED STATES | NORTHWEST | NORTH AMERICA | 225,642 | 525,591 | 900,654 |
| 7 | NAME_9 | ONTARIO | CANADA | CANADA | NORTH AMERICA | 233,160 | 472,768 | 340,638 |
| 8 | NAME_5 | ALBERTA | CANADA | CANADA | NORTH AMERICA | 271,361 | 900,654 | 698,876 |
| 9 | NAME_1 | WASHINGTON | UNITED STATES | NORTHWEST | NORTH AMERICA | 277,042 | 493,251 | 236,611 |
| 10 | NAME_12 | ENGLAND | UNITED KINGDOM | UNITED KINGDOM | EUROPE | 277,891 | 404,937 | 472,768 |
| 11 | NAME_13 | GIRONDE | FRANCE | FRANCE | EUROPE | 281,477 | 300,189 | 496,272 |
| 12 | NAME_8 | CALIFORNIA | UNITED STATES | SOUTHWEST | NORTH AMERICA | 288,176 | 236,611 | 525,591 |
| 13 | NAME_3 | UTAH | UNITED STATES | SOUTHWEST | NORTH AMERICA | 289,180 | 365,167 | 404,937 |
| 14 | NAME_2 | MICHIGAN | UNITED STATES | NORTHEAST | NORTH AMERICA | 654,987 | 455,281 | 300,189 |
| 15 | | | | | | | | |
| 16 | NAME_X | GIRONDE | FRANCE | FRANCE | EUROPE | 323,303 | 200,333 | 343,300 |

| | A | B | C | D | E | F | G | H |
|---|---|---|---|---|---|---|---|---|
| 1 | NAME | STATE/ PROVINCE | COUNTRY/REGION | TERRITORY | TERRITORY GROUP | SALES '09 | SALES '10 | |
| 2 | NAME_7 | OREGON | UNITED STATES | NORTHWEST | NORTH AMERICA | 120,252 | 698,876 | 343,251 |
| 3 | NAME_10 | WASHINGTON | UNITED STATES | NORTHWEST | NORTH AMERICA | 177,471 | 496,272 | 455,281 |
| 4 | NAME_6 | TENNESSEE | UNITED STATES | SOUTHEAST | NORTH AMERICA | 194,177 | 340,638 | 365,167 |
| 5 | NAME_4 | MINNESOTA | UNITED STATES | CENTRAL | NORTH AMERICA | 202,346 | 391,750 | 391,750 |
| 6 | NAME_11 | WASHINGTON | UNITED STATES | NORTHWEST | NORTH AMERICA | 225,642 | 525,591 | 900,654 |
| 7 | NAME_9 | ONTARIO | CANADA | CANADA | NORTH AMERICA | 233,160 | 472,768 | 340,638 |
| 8 | NAME_5 | ALBERTA | CANADA | CANADA | NORTH AMERICA | 271,361 | 900,654 | 698,876 |
| 9 | NAME_1 | WASHINGTON | UNITED STATES | NORTHWEST | NORTH AMERICA | 277,042 | 493,251 | 236,611 |
| 10 | NAME_12 | ENGLAND | UNITED KINGDOM | UNITED KINGDOM | EUROPE | 277,891 | 404,937 | 472,768 |
| 11 | NAME_13 | GIRONDE | FRANCE | FRANCE | EUROPE | 281,477 | 300,189 | 496,272 |
| 12 | NAME_8 | CALIFORNIA | UNITED STATES | SOUTHWEST | NORTH AMERICA | 288,176 | 236,611 | 525,591 |
| 13 | NAME_3 | UTAH | UNITED STATES | SOUTHWEST | NORTH AMERICA | 289,180 | 365,167 | 404,937 |
| 14 | NAME_2 | MICHIGAN | UNITED STATES | NORTHEAST | NORTH AMERICA | 654,987 | 455,281 | 300,189 |
| 15 | | | | | | | | |
| 16 | NAME_X | GIRONDE | FRANCE | FRANCE | EUROPE | 323,303 | 200,333 | 343,300 |

| | A | B | C | D | E | F | G |
|---|---|---|---|---|---|---|---|
| 1 | NAME | COUNTRY/REGION | TERRITORY | TERRITORY GROUP | SALES 2009 | | |
| 2 | NAME_1 | UNITED STATES | NORTHWEST | NORTH AMERICA | 277,042 | | 539,030 |
| 3 | NAME_2 | UNITED STATES | NORTHEAST | NORTH AMERICA | 654,987 | | 565,432 |
| 4 | NAME_3 | UNITED STATES | SOUTHWEST | NORTH AMERICA | 289,180 | | 596,901 |
| 5 | NAME_4 | UNITED STATES | CENTRAL | NORTH AMERICA | 202,346 | | 773,137 |
| 6 | NAME_5 | CANADA | CANADA | NORTH AMERICA | 271,361 | | 821,330 |
| 7 | NAME_6 | UNITED STATES | SOUTHEAST | NORTH AMERICA | 194,177 | | 855,674 |
| 8 | NAME_7 | UNITED STATES | NORTHWEST | NORTH AMERICA | 120,252 | | 845,823 |
| 9 | NAME_8 | UNITED STATES | SOUTHWEST | NORTH AMERICA | 288,176 | | 761,463 |
| 10 | NAME_9 | CANADA | CANADA | NORTH AMERICA | 233,160 | | 510,223 |
| 11 | | | | | | | |
| 12 | ENGLAND | UNITED KINGDOM | UNITED KINGDOM | EUROPE | 277,891 | 404,937 | |
| 13 | | | | | | | 743,027 |

| | A | B | C | D | E | F | G |
|---|---|---|---|---|---|---|---|
| 1 | NAME | COUNTRY/REGION | TERRITORY | TERRITORY GROUP | SALES 2009 | | |
| 2 | NAME_1 | UNITED STATES | NORTHWEST | NORTH AMERICA | 277,042 | | 539,030 |
| 3 | NAME_2 | UNITED STATES | NORTHEAST | NORTH AMERICA | 654,987 | | 565,432 |
| 4 | NAME_3 | UNITED STATES | SOUTHWEST | NORTH AMERICA | 289,180 | | 596,901 |
| 5 | NAME_4 | UNITED STATES | CENTRAL | NORTH AMERICA | 202,346 | | 773,137 |
| 6 | NAME_5 | CANADA | CANADA | NORTH AMERICA | 271,361 | | 821,330 |
| 7 | NAME_6 | UNITED STATES | SOUTHEAST | NORTH AMERICA | 194,177 | | 855,674 |
| 8 | NAME_7 | UNITED STATES | NORTHWEST | NORTH AMERICA | 120,252 | | 845,923 |
| 9 | NAME_8 | UNITED STATES | SOUTHWEST | NORTH AMERICA | 288,176 | | 767,463 |
| 10 | NAME_9 | CANADA | CANADA | NORTH AMERICA | 233,160 | | 510,223 |
| 11 | | | | | | | |
| 12 | | UNITED KINGDOM | UNITED KINGDOM | EUROPE | 277,891 | 404,937 | |
| 13 | ENGLAND | | | | | | 743,027 |

|   | A | B | C | D | E | F | G | H |
|---|---|---|---|---|---|---|---|---|
| 1 |   |   |   |   |   |   |   |   |
| 2 | NAME_1 | WASHINGTON | UNITED STATES | NORTHWEST | NORTH AMERICA | 277,042 | 493,251 | 493,251 |
| 3 | NAME_2 | MICHIGAN | UNITED STATES | NORTHEAST | NORTH AMERICA | 654,987 | 455,281 | 455,281 |
| 4 | NAME_3 | UTAH | UNITED STATES | SOUTHWEST | NORTH AMERICA | 289,180 | 365,167 | 365,167 |
| 5 | NAME_4 | MINNESOTA | UNITED STATES | CENTRAL | NORTH AMERICA | 202,346 | 391,750 | 391,750 |
| 6 | NAME_5 | ALBERTA | CANADA | CANADA | NORTH AMERICA | 271,361 | 900,654 | 900,654 |
| 7 | NAME_6 | TENNESSEE | UNITED STATES | SOUTHEAST | NORTH AMERICA | 194,177 | 340,638 | 340,638 |
| 8 | NAME_7 | OREGON | UNITED STATES | NORTHWEST | NORTH AMERICA | 120,252 | 698,876 | 698,876 |
| 9 | NAME_8 | CALIFORNIA | UNITED STATES | SOUTHWEST | NORTH AMERICA | 288,176 | 236,611 | 236,611 |
| 10 | NAME_9 | ONTARIO | CANADA | CANADA | NORTH AMERICA | 233,160 | 472,768 | 472,768 |
| 11 | NAME_10 | WASHINGTON | UNITED STATES | NORTHWEST | NORTH AMERICA | 177,471 | 496,272 |   |
| 12 | NAME_11 | WASHINGTON | UNITED STATES | NORTHWEST | NORTH AMERICA | 225,642 | 525,591 |   |
| 13 | NAME_12 | ENGLAND | UNITED KINGDOM | UNITED KINGDOM | EUROPE | 277,891 | 404,937 |   |
| 14 | NAME_13 | GIRONDE | FRANCE | FRANCE | EUROPE | 281,477 | 300,189 |   |
| 15 |   |   |   |   |   |   |   | 200,333 |
| 16 | NAME_X | GIRONDE | FRANCE | FRANCE | EUROPE | 323,303 | 200,333 | 343,300 |

*FIG. 7A*

| | A | B | C | D | E | F | G | H |
|---|---|---|---|---|---|---|---|---|
| 1 | | | | | | | | |
| 2 | NAME_1 | WASHINGTON | UNITED STATES | NORTHWEST | NORTH AMERICA | 277,042 | 493,251 | 493,251 |
| 3 | NAME_2 | MICHIGAN | UNITED STATES | NORTHEAST | NORTH AMERICA | 654,987 | 455,281 | 455,281 |
| 4 | NAME_3 | UTAH | UNITED STATES | SOUTHWEST | NORTH AMERICA | 289,180 | 365,167 | 365,167 |
| 5 | NAME_4 | MINNESOTA | UNITED STATES | CENTRAL | NORTH AMERICA | 202,346 | 391,750 | 391,750 |
| 6 | NAME_5 | ALBERTA | CANADA | | NORTH AMERICA | 271,361 | 900,654 | 900,654 |
| 7 | NAME_6 | TENNESSEE | UNITED STATES | SOUTHEAST | NORTH AMERICA | 194,177 | 340,638 | 340,638 |
| 8 | NAME_7 | OREGON | UNITED STATES | NORTHWEST | NORTH AMERICA | 120,252 | 698,876 | 698,876 |
| 9 | NAME_8 | CALIFORNIA | UNITED STATES | SOUTHWEST | NORTH AMERICA | 288,176 | 236,611 | 236,611 |
| 10 | NAME_9 | ONTARIO | CANADA | | NORTH AMERICA | 233,160 | 472,768 | 472,768 |
| 11 | NAME_10 | WASHINGTON | UNITED STATES | NORTHWEST | NORTH AMERICA | 177,471 | 496,272 | |
| 12 | NAME_11 | WASHINGTON | UNITED STATES | NORTHWEST | NORTH AMERICA | 225,642 | 525,591 | |
| 13 | NAME_12 | ENGLAND | UNITED KINGDOM | UNITED KINGDOM | EUROPE | 277,891 | 404,937 | |
| 14 | NAME_13 | GIRONDE | FRANCE | FRANCE | EUROPE | 281,477 | 300,189 | |
| 15 | | | | | | | | |
| 16 | NAME_X | GIRONDE | FRANCE | FRANCE | EUROPE | 323,303 | 200,333 | 200,333 |
| | | | | | | | | 343,300 |

FIG. 7B

ENHANCED INDICATORS FOR IDENTIFYING AFFECTED DATA

BACKGROUND

Productivity applications, such as MICROSOFT EXCEL, available from Microsoft Corporation of Redmond, Wash., provide powerful features that enable users to efficiently edit, view and process large volumes of information. Some illustrative examples of operations that provide these features include: filtering, sorting, searching, charting, conditional formatting, among many others. Despite the many benefits these operations provide, some users may avoid a particular operation because they are intimidated by the operation's apparent complexity, or they are afraid of trying a complex operation due to the concern that the operation may modify their data into an undesirable state.

For some users, the overall impact of certain operations may not be readily apparent. For example, when a sort is performed on a table that is created within a spreadsheet, some users may not know if the sort applies to all of the cells in the spreadsheet or if the sort only applies to the cells within the table. In other situations, some users may not know if the sort applies to a single column of the table or if the sort applies to the entire table. In addition, some users have been known to avoid the use of certain operations that apply to tables due to the concern that an operation, such as a sort, will disassociate relationships between the cells of the table. Such issues are particularly troublesome for users who do not fully understand that the table is a unified data element with cells having properties and cell associations that are isolated from other cells of the spreadsheet.

A specific example illustrating the above-described disadvantages may involve a table having a number of rows, with each row having three columns of data: a name, address and zip code. From the perspective of some users, if data of the table is sorted by, for example, the zip code, it may not be readily clear if the addresses and names will be sorted with the zip codes. In addition, it may not be readily clear if the cells outside of the table are affected by the sort. Similar concerns apply to users who do not understand how other functions, such as filter and search, impact data of tables or other collections of data. Thus, such features may not be utilized.

It is with respect to these and other considerations that the disclosure made herein is presented.

SUMMARY

Concepts and technologies are described herein for displaying one or more visual indicators to assist users in identifying cells of a spreadsheet that are affected by an operation. In embodiments disclosed herein, a spreadsheet application is configured to receive a request to perform an operation on cells of a spreadsheet. In response to receiving the request, the spreadsheet application identifies one or more cells of the spreadsheet that are affected by the operation. The spreadsheet application then displays a visual indicator that emphasizes the affected cells. By providing a timely displayed visual indicator that emphasizes or brings attention to the affected cells, the user is able to gain a better perspective of the extent of the operation and how the operation applies to the cells of the spreadsheet or the table.

According to various embodiments, the visual indicator may be a border that emphasizes the affected cells. Among many variations, the border may emphasize the affected cells with the presentation of one or more distinguishing features. For example, the border may include a variety of shapes, thicknesses or patterns to emphasize the affected cells. In other variations, the border may include an animation, where a variety of shapes, patterns, graphics or colors are introduced in an animated manner to emphasize the affected cells. In addition to, or as an alternative to the border, the visual indicator may include an operation that shades the affected cells and/or the associated row headers and column headers.

According to various embodiments, the display of the visual indicator may occur prior to, during and/or after the execution of the requested operation. For example, in response to receiving the request to perform the operation, the application may display the visual indicator prior to or during the requested operation. The visual indicator may remain as a static object or it may be removed after a time period. In another example, a first visual indicator may be displayed prior to or during the requested operation. The first visual indicator may only be displayed for a time period. Then, after the time period or after the execution of the requested operation, a second visual indicator may be displayed. As will be described in more detail below, the techniques described herein include variations and combinations of visual indicators to bring attention to the affected cells.

According to various embodiments, illustrative techniques disclosed herein apply to tables of a spreadsheet. In a non-limiting example, a spreadsheet application may display a table with a number of cells. In response to receiving a request to perform an operation on at least one of the cells of the table, the spreadsheet application identifies one or more cells of the table that are to be affected by the operation. The spreadsheet application then displays a visual indicator to emphasize the cells of the table affected by the operation.

According to various embodiments, a requested operation may include the selection of one or more cells of a table. In one non-limiting example, a method includes displaying a table with a number of cells, and receiving a request to perform an operation on at least one of the cells of the table. The request includes a selection of a header of one or more selected cells. In response to receiving the request to perform the operation, the method identifies one or more cells of the table that are to be affected by the operation, wherein the affected cells are related to the header of the one or more selected cells, and the one or more selected cells are limited to the boundaries of the table. The method then displays a visual indicator to emphasize the cells of the table affected by the operation.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1 is a user interface diagram illustrating cells of a table in relation to cells of a spreadsheet, according to an illustrative embodiment.

FIGS. 3A-3C illustrate user interface diagrams showing several example visual indicators, according to an illustrative embodiment.

FIGS. 4A-4D illustrate a sequence of user interface diagrams showing an animation of a cell shading process for highlighting cells of a table that are affected by an operation, according to an illustrative embodiment.

FIGS. 5A-5C illustrate user interface diagrams showing results of a requested operation performed on data of a table and several visual indicators that are displayed after or during the performance the requested operation, according to an illustrative embodiment.

FIGS. 6A-6D illustrate interface features of a tablet device configured with an input mechanism for selecting cells of a table and cells of a spreadsheet, according to an illustrative embodiment.

FIGS. 7A-7B illustrate user interface features used for selecting cells of a spreadsheet based on patterns and/or groupings of cell data, according to an illustrative embodiment.

DETAILED DESCRIPTION

Figure 2:
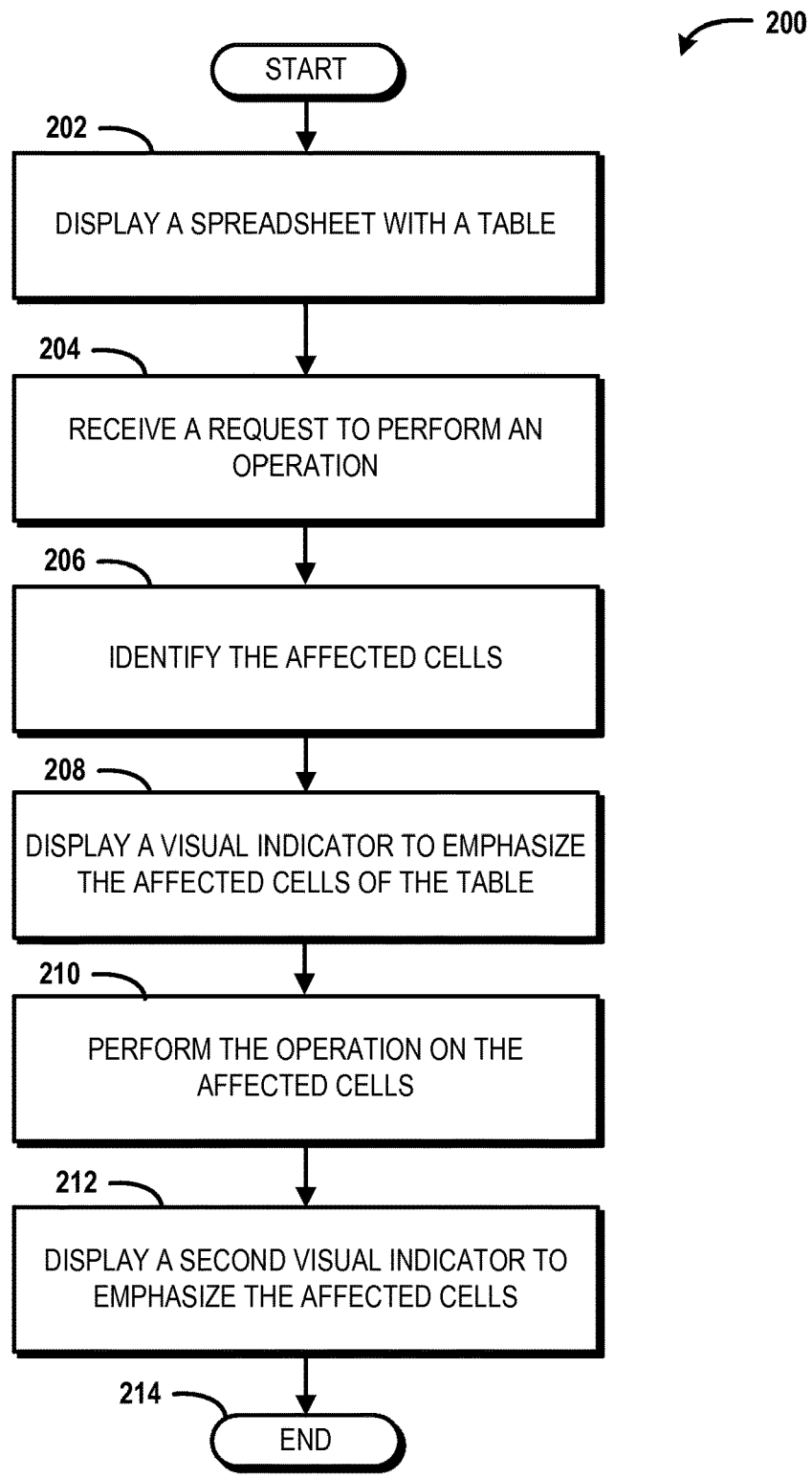
FIG. 2 is a flow diagram illustrating aspects of a method for displaying one or more visual indicators to assist in the identification of cells that are affected by an operation, according to an illustrative embodiment.

The following detailed description is directed to concepts and technologies for displaying one or more visual indicators to assist users in identifying cells that are affected by an operation performed by a spreadsheet application. In embodiments disclosed herein, a spreadsheet application is configured to receive a request to perform an operation on cells of a spreadsheet. In response to receiving the request to perform the operation, the application identifies one or more cells of the spreadsheet affected by the operation. The spreadsheet application then displays a visual indicator that emphasizes the affected cells. By providing a timely displayed visual indicator that emphasizes or brings attention to the affected cells, the user is able to gain a better perspective of the extent of the operation and how the operation applies to the cells of the spreadsheet.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodologies for displaying one or more visual indicators to assist users in identifying cells that are affected by an operation. As will be described in more detail below with respect to FIGS. 9-11, there are a number of applications and services that can embody the functionality and techniques described herein.

Referring now to FIG. 1, a user interface 100 illustrating aspects of a spreadsheet 102 and a table 104 will be described, according to various illustrative embodiments. As can be appreciated, the spreadsheet 102 includes a number of rows and columns of cells. Each cell is configured to store data. For illustrative purposes, the spreadsheet 102 includes eight columns, each labeled as a different category of data. In particular, example data of the spreadsheet 102 includes a "name" column (A), a "state/province" column (B), a "country/region" column (C), a "territory" column (D), a "territory group" column (E), a "sales 2009" column (F), a "sales 2010" column (G) and an unlabeled column (H). The data included in each of the columns (A-H) is for purposes of illustration and is not intended to be limiting in any way. The spreadsheet 102 is not limited to the number of rows and columns shown in the illustrated embodiment. Moreover, the spreadsheet 102 need not be populated with data in every cell.

The table 104 shown in FIG. 1 includes a subset of the cells of the spreadsheet 102. Generally described, cells that are associated with the table 104 operate as a unified element of data where associations between the cells of the table 104 are maintained. In the illustrative example of FIG. 1, the table 104 includes the cells in columns A-G within rows 1-14, which are outlined with a border 112. As can be appreciated, the table 104 may be formed by a user input providing a selection of cells and the execution of a command for creating the table 104.

MICROSOFT EXCEL, for example, provides a specific command for creating a table 104 within a spreadsheet 102. Once the table 104 is formed, one or more known techniques may be used by an application to create the associations between cells of the table 104. For instance, with reference to the example data of FIG. 1, the formation of the table 104 creates an association between the cells of each individual row. Thus, within an individual row, each category, e.g., the name, state, country/region, territory, territory group and respective sales data, shares an association. In looking further into the data of row 2, for example, there is an association between each entry, e.g., "NAME_1," "WASHINGTON," "UNITED STATES," "NORTHWEST," "NORTH AMERICA," "277,042" and "493,251." However, the entry of cell H2, having the entry of "343,251" does not have an association with the cells of the table 104.

The above-described associations between the cells of the table 104 allow for one or more operations to be applied to data of the table 104 in a unique way. In a few non-limiting examples, a filter, sort or search may be performed on cells of the table 104. When such operations are applied to data of the table 104, the results are different than results that are produced when such operations are applied to cells outside of a table. For illustrative purposes, with reference to the sample data of FIG. 1, if a sort operation is performed on the data of table 104, and the sort is based on the cells of column F, the operation is applied to cells within the table 104. Thus, the cells of the table 104 are sorted based on the values of the cells in column F.

The results of the sort applied to the sample data of FIG. 1 are shown in FIG. 5A. As shown, the entry "NAME_1" and the associated entries are repositioned together from row 2 to row 9. Also shown in FIG. 5A, and described in more detail below, the other rows of data are sorted accordingly. Such an example shows that the sort is applied to the cells of the table 104 and that the association between the cells of individual rows are maintained. As can be appreciated, the same associations are maintained in other operations as well, such as a filter operation or a search operation.

The associations between the cells of the table 104 are independent from the cells outside of the table 104. For instance, the cells in column H do not have an association with any one of cells in the table 104. In a more specific example, cell H2 does not have an association with cells A2-G2. Thus, in the above-described example involving the sort shown in FIGS. 1 and 5A, although the data of cells A2-G2 moved from the second row to the ninth row, the data of cell H2 remained in the second row.

The cells of the table 104 may be distinguished with a shading pattern, such as the alternating row shades shown in FIG. 1. In addition, as mentioned above, the display of the table 104 may be displayed with an initial border 112. The table 104 may also include the display of one or more controls 110 for invoking operations that apply to the cells of the table 104. As summarized above, although there may be one or more visual indicators that outline the table 104, some users may not use one or more of the controls 110 due to a lack of understanding of the related operations or the functional characteristics of the table 104.

Turning now to FIG. 2, aspects of a method 200 for displaying one or more visual indicators to assist users in identifying cells that are affected by an operation performed on a table 104, according to an illustrative embodiment, are shown and described below. Although the following description involves an embodiment that involves the table 104, it should be understood that the operations of the methods disclosed herein are not necessarily dependent on the use of the table 104. As will be described below, other techniques for identifying cells that are affected by an operation involve cell groupings and/or patterns.

It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As will be described in more detail below, in conjunction with FIGS. 8-10, the operations of the method 200 are described herein as being implemented, at least in part, by an application, such as the spreadsheet application 813 of FIG. 8. Although the following illustration refers to the spreadsheet application 813, it can be appreciated that the operations of the method 200 may be also implemented in many other ways. For example, the method 200 may be implemented by the use of the general application 818 of FIG. 8, e.g., a word processing application, customer relationship management (CRM) software, etc. In addition, one or more of the operations of the method 200 may alternatively or additionally be implemented, at least in part, by a web browser application 810 of FIG. 8 working in conjunction with an application service 924 of FIG. 9.

With reference to FIG. 2, the method 200 begins at operation 202, where the spreadsheet application 813 displays the spreadsheet 102 with at least one table 104. As summarized above, the spreadsheet 102 includes a number of rows and columns of cells configured to store data. In addition, as summarized above, the cells of the table 104 operate as a unified element of data where associations between cells within the table 104 are maintained.

For illustrative purposes, operation 202 may involve the display of the spreadsheet 102 and table 104 of FIG. 1. As can be appreciated, operation 202 may involve the display of a table and a spreadsheet of any size or dimension. In addition, the table 104 displayed in operation 202 may or may not include the display of shaded cells and/or borders that outline the cells of the table 104. In addition, operation 202 may or may not include the display of the controls 110. As explained in more detail below, for embodiments and implementations that do not utilize tables, operation 202 may involve the display of a spreadsheet 102 without the display of a table.

Next, at operation 204, the spreadsheet application 813 receives a request to perform an operation on the data of the table 104. In operation 204, a request to perform the operation may include any command or function call to manipulate, process or select data of the spreadsheet 102 or the table 104. MICROSOFT EXCEL, for example, provides a number of commands and application features for sorting, filtering, selecting or otherwise processing data, all of which may be called in operation 204.

Although these example commands and application features are used for illustrative purposes, these examples are intended to be provided for illustrative purposes and not limiting. As explained in more detail below, for embodiments and implementations that do not utilize tables, operation 204 may involve a request to perform an operation on data on any cell of the spreadsheet 102.

Next, the method 200 proceeds to operation 206, where the spreadsheet application 813 identifies the cells that are affected by the requested operation. In some embodiments, operation 206 analyzes the cells of the spreadsheet 102 and the table 104. The cells that are associated with the table 104 are identified as cells that are affected by the requested operation. In other embodiments, as described in more detail below, depending on the requested operation, a subset of cells of the table 104 may be identified as cells that are affected by the requested operation. In applying the example data shown in FIG. 3A to operation 206, the affected cells include the cells of the table 104, which are outlined by the border 301.

In other embodiments, operation 206 analyzes the cells of the spreadsheet 102 to identify affected cells based on groupings and/or patterns of data arranged in the cells. As explained in more detail below in the description of FIGS. 7A and 7B, the affected cells may be identified if a particular grouping of data exists. In other implementations, patterns of data in the cells of the spreadsheet 102 may be used to identify the affected cells.

Next, at operation 208, the spreadsheet application 813 displays one or more visual indicators to emphasize the affected cells. As summarized above, one or more timely displayed visual indicators bring attention to the affected cells. This enables the user to gain a better perspective of the extent of the requested operation. In various embodiments, the one or more visual indicators are configured to show how the requested operation applies to the cells of the table 104 versus the cells of the spreadsheet 102. In addition, in some embodiments, the display of the one or more visual indicators, of operation 208, may be in response to the request to perform the operation on the data of the table 104.

The display of the one or more visual indicators may also be triggered by other events or controls, such as, for example, the completion of a requested operation. As described in more detail below, a visual indicator displayed in operation 208 may be presented in a number of forms. With reference to FIGS. 3A-3C, 4A-4D, 6D and 7B, some illustrative examples of several visual indicators, which may be used individually or in combination, are shown and described below.

Referring now to FIG. 3A, according to various embodiments, the visual indicator may be a border 301 that emphasizes the affected cells. The border 301 may be formed with any shape, thickness, and/or color that brings attention to the affected cells. For instance, in a non-limiting example, the border 301 may have a thickness that distinguishes the border 301 from other lines displayed in the spreadsheet 102. The border 301 may comprise one or more colors that creates a contrast with other colors displayed on the spreadsheet 102. In addition, the display of the border 301 may involve the use of one or more objects, images, and/or graphics to bring attention to the affected cells.

The border 301 may also include the use of one or more animations. For instance, the border 301 may include one or more animations that changes the thickness, shape and/or color of the border 301. In a non-limiting example, the border 301 may be configured to appear as a pulsing line that varies in thickness and/or color in an animated fashion. In other non-limiting examples, the border 301 may be configured with an animation to make the lines of the border 301 appear as if they are emitting light. In such an example, graphical lines and objects may appear to be moving around or within the border 301. Any color, shape and/or thickness, whether static or animated, may be used to form the border 301.

If the spreadsheet application 813 is configured to display the initial border 112, which may occur when the table 104 is displayed in operation 202, operation 208 may involve a process where the initial border 112 transforms into a second form to bring attention to the affected cells. In a non-limiting example, the initial border 112 may be formed having a first shape, color and/or thickness. The second form of the border may be formed in a second shape, color and/or thickness that is distinguished from the initial border 112. Regardless of the form, shape or color of the second form of the border, any form that brings attention to the affected cells may be used in operation 208. In addition, the timing of the transition of the second form can be prior to, during or after the performance of the requested operation.

Alternatively, if the spreadsheet application 813 does not display the initial border 112, as shown in FIG. 1, operation 208 may display the border 301 in response to receiving the requested operation. The border 301 may take any form as described above or the border 301 may take any form that brings attention to the affected cells. Optionally, the border 301 may be displayed for a period of time, after which the border 301 may be removed or configured to transition into another form. In addition, the border 301 may be removed in response to an action, such as the completion of the requested operation.

Referring now to FIG. 3B, in addition to, or as an alternative to the display of the border 301, various embodiments of the visual indicator may include a distinguished shade, color or graphic in the row and/or column headers of the affected cells. FIG. 3B illustrates the spreadsheet 102 and the table 104. In addition, FIG. 3B illustrates a row header 305 and a column header 306 that are each configured with a visual indicator to bring attention to the affected cells. As shown in FIG. 3B, the row header 305 may include cells that are shaded, colored, shaped or otherwise emphasized in a manner that brings attention to the affected cells. In applying the example data, to bring attention to the affect cells, the row header 305 displays a visual indicator that brings attention to rows 1-14.

As also shown in FIG. 3B, the column header 306 may include cells that are shaded, colored, shaped or otherwise emphasized in a manner that brings attention to the affected cells. For illustrative purposes, the row header 305 and the column header 306 configured with one or more visual indicators are referred to herein as "distinguished headers." In applying the example data, to bring attention to the affect cells, the column header 306 displays a visual indicator that brings attention to columns A-G.

Although the illustrative embodiment of FIG. 3B shows the row header 305 and the column header 306 each configured with shaded blocks, it should be appreciated that this example is provided for illustrative purposes and should not be construed as limiting. As can be appreciated, any other graphical feature of a column header or a row header associated with an affected cell may be used with techniques disclosed herein, such as, for example, borders or images may be displayed around or near the headers, etc.

Referring now to FIG. 3C, in addition to, or as an alternative to, the embodiments described above, various embodiments of the visual indicator may include a distinguished shade, color or graphic in the affected cells. FIG. 3C illustrates the spreadsheet 102 and the table 104. In addition, FIG. 3C displays a distinguished shade in the affected cells.

As with other embodiments described above, the shaded cells 307 may be displayed for a period of time or, alternatively, the shaded cells 307 may remain as a static component. Regardless of the form, color or graphics used to distinguish the affected cells, any type of visual indicator applied to the affected cells may be used. As shown in FIG. 3C, the shaded cells 307 may be displayed with the initial border 112 or another visual indicator, such as the border 301 of FIG. 3. The display of the shaded cells 307 may be displayed with or without the distinguished headers 305 and 306.

Turning now to FIGS. 4A-4D, another embodiment involving the animation of a visual indicator is shown and described. FIGS. 4A-4D illustrate a sequence of interface diagrams illustrating an animation of one visual indicator. In this example, FIG. 4A illustrates a shading process starting with cell A2. Then in FIGS. 4B-4D, the shading progressively moves from cell A2 across the screen until the affected cells are shaded. As can be appreciated, the example of FIGS. 4A-4D is provided for illustrative purposes and not to be construed as limiting. Any animation of one or more visual indicators can be generated by operation 208. For example, the animation of a shading process may involve any fill pattern that creates a motion in any direction, such as an up to down, down to up, right to left, or left to right, a diagonal direction, etc. Animations may also start from the center of the affected cells and grow outward, or start on near one or more borders and progress in an inward direction, etc. It can be appreciated that regardless of the form, color, graphics or shading or pattern, any animation may be used to bring attention to the affected cells.

In addition to, or as an alternative to, the embodiments described above, operation 208 may include a modification or highlight of the text of the affected cells. In such an embodiment, text within the affected cells may be modified, shaped, colored or otherwise emphasized in a manner that brings attention to the affected cells. For instance, focus may be given to the text in the affected cells by the modification of one or more properties or text features, such as the font type, font size, boldface, italics, underline, overline, capitalization, letter spacing, punctuation, color, combinations thereof, and the like.

As can be appreciated, operation 208 may involve any combination of the above-described visual indicators, or other visual indicators, to bring attention to the affected cells. In addition, it can be appreciated that the one or more visual indicators displayed in operation 208 may be displayed for a period of time, after which the one or more visual indicators may be removed or configured to transition into another form. In addition, the one or more visual indicators may be removed in response to an action, such as the completion of the requested operation.

Returning again to FIG. 2, the method 200 proceeds to operation 210 where the spreadsheet application 813 performs the requested operation on the affected cells. The requested operation may be performed in response to the request received in operation 202. As summarized above, the performance of the requested operation may include any command or function call to manipulate, process or select data of the affected cells. MICROSOFT EXCEL, for example, provides a number of commands and features for sorting, filtering, selecting or otherwise processing data. Such commands and features may be used in operation 210. However, such commands and features are provided for purposes of illustration and are not intended to be limiting in any way.

Turning now to FIGS. 5A, for illustrative purposes, the results of a sort applied to the sample data of FIG. 1 is shown and described. As summarized above, in this example, the sort is performed on the data of table 104, and the sort is based on the data of column F. A highlighted control 510 is also displayed to illustrate that the sort is based on column F. As shown in the FIG. 1 and FIG. 5A, as a result of the sort, the entry "NAME_1" and all of the associated entries are moved together from row 2 to row 9. The results of this example show that the sort is applied to the cells of the table 104 and that the association between the cells of individual rows are maintained. As can be appreciated, the same associations are maintained in other operations as well, such as a filter operation or a search operation.

Although the method 200 illustrates an embodiment where the display of the visual indicator, at operation 208, occurs prior to the performance of the requested operation, at operation 210, it can be appreciated that the display of the visual indicator may occur during or after the performance of the requested operation. In addition, as described below, techniques provided herein may also involve the display of one visual indicator that is displayed before or during the requested operation and another visual indicator that is displayed after or during the performance of the requested operation.

Returning to FIG. 2, at operation 212, the spreadsheet application 813 displays a second visual indicator that brings attention to the affected cells. In one embodiment, the display of the second visual indicator may occur after the first visual indicator, from operation 208, is displayed and removed. In other embodiments provided herein, the display of the second visual indicator may include an overlay, at least in part, over the first visual indicator. In yet another embodiment, the second visual indicator may be an enhancement of the first visual indicator. In other embodiments, as described in more detail below, the second visual indicator may be an object that appears as a transformation of the first visual indicator.

The second visual indicator displayed in operation 212 may be in any form that brings attention to the cells that were affected by the requested operation. For instance, the visual indicator displayed in operation 212 may be a border, a cell shading, a header shading, or any combination thereof. The second visual indicator displayed in operation 212 may take a different form than the first visual indicator displayed in operation 208. Alternatively, the second visual indicator displayed in operation 212 may be in the same form as the first visual indicator, but presented at a different time than the first visual indicator.

As described above, in the illustrative examples provided herein, the first visual indicator displayed in operation 208 may include one or more forms, such as the border 301, headers 305 and 306, and/or the shaded cells 307. The first visual indicator may be displayed prior to or during the performance of the requested operation. Then, during or after the performance of the requested operation, the first visual indicator may be removed. After the removal of the first visual indicator, the second visual indicator may be displayed. As can be appreciated, the second visual indicator may include any distinguished shade, color or graphic that brings attention to the affected cells. The second visual indicator may be displayed after the first visual indicator is removed.

Turning now to FIG. 5B, another embodiment of a visual indicator that may be displayed in operation 212 is shown and described. FIG. 5B illustrates the sorted sample data shown in FIG. 5A. In addition, FIG. 5B illustrates the display of a border 501 configured to bring attention to the affected cells of the requested operation, e.g., the sort operation. In one embodiment, the border 501 may be displayed after the border 301 is temporarily displayed in operation 208 and removed after a predetermined time period. In another embodiment, the border 501 may be an overlay or enhancement of border 301.

The border 501 may be formed with any image, shape, thickness, and/or color that brings attention to the affected cells. For instance, in a non-limiting example, the border 501 may have a thickness that distinguishes the border 501 from other lines displayed in the spreadsheet 102, and the border 501 may comprise one or more colors that creates a contrast with other colors displayed on the spreadsheet 102. In addition, the border 501 may have a color, thickness, shape and/or form that distinguishes the border 501 from the previously displayed border 301. As can be appreciated, the use of one or more animations may be used in the display of the border 501.

Turning now to FIG. 5C, additional embodiments of the visual indicator that may be displayed in operation 212 are shown and described. FIG. 5C illustrates the sorted data shown in FIG. 5A. In addition, FIG. 5C illustrates the display of a row header 505 and a column header 506 that are each configured with a visual indicator to bring attention to the affected cells. As shown in FIG. 5C, the row header 505 may be shaded, colored, shaped or otherwise emphasized in a manner that brings attention to the affected cells. In applying this embodiment to the example data, the row header 505 includes shading that brings attention to rows 1-14. As also shown in FIG. 5C, the column header 506 may be shaded, colored, shaped or otherwise emphasized in a manner that brings attention to the affected cells. In applying this embodiment to the example data, the column header 506 includes shading that brings attention to columns A-G. The row header 505 and the column header 506 may be displayed with or without the border 501. FIG. 5C also illustrates another aspect of the visual indicator for bringing attention to an active column 530. As can be appreciated, an "active column" generally includes data that is used in the requested operation. In the above-described example involving the sort results illustrated in FIGS. 5A-5C, the active column is column F, which provides the base data for the sort that is performed.

The visual indicator used to bring attention to the active column 530 may include the use of any type of shade, border, color, or any other technique to distinguish the active column 530 from other columns. In addition, as shown in FIG. 5C, the header of the active column may include any color, shade, border or graphic that distinguishes the header of the active column from the headers of the other columns. As depicted in FIG. 5C, for example, the header of column F has a shade that is distinguished from the headers of columns A-E and G. As can be appreciated, embodiments of the visual indicators illustrated in FIGS. 5B and 5C may be used individually or in combination.

Returning to FIG. 2, after the display of the second visual indicator the method 200 then proceeds to operation 214, where the method 200 terminates. Like other operations disclosed herein, the display of the second visual indicator, at operation 212, is an optional feature. For embodiments that do not include the display of the second visual indicator, the method 200 may terminate after the display of the first visual indicator at operation 208. In such an embodiment, the spreadsheet application 813 may be configured to bring attention to the affected cells without performing the requested operation. In other embodiments, the method 200 may terminate after the performance of the requested operation at operation 210.

Figure 6B:
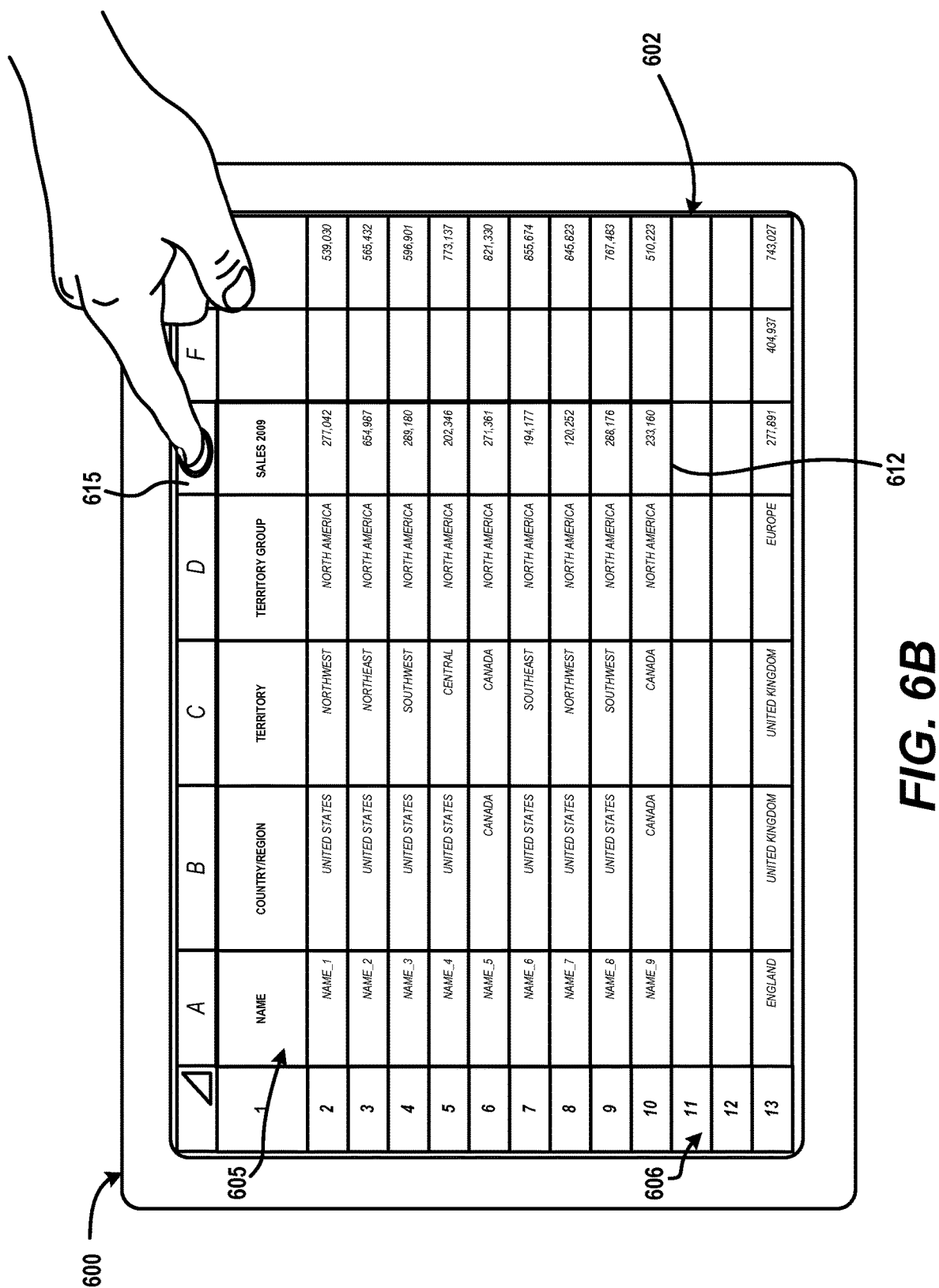

Turning now to FIGS. 6A-6D, an illustrative embodiment for displaying visual indicators for affected cells in a touch-environment is shown and described. This illustrated example shows how various operations of the method 200 of FIG. 2 may be used to select cells of a table or cells of a spreadsheet. FIG. 6A depicts an illustrative tablet device 600 with a touch-enabled screen 602. In this illustrative example, in applying operation 202 to this example, the touch-enabled screen 602 displays a spreadsheet 606, a table 605, and a border 612 that outlines the cells of the table 605.

FIG. 6B illustrates the spreadsheet 606 and the table 605 along with an input gesture from a user. This illustrative example applies to operation 204 of FIG. 2 where the touch-enabled screen 602 receives the request to perform a requested operation on data of the spreadsheet 606. In the present example, as shown in FIG. 6B, the request is received when the user places a finger on the touch-enabled screen 602. Specifically, the user provides the request by touching the grid header 615 of column E. In response to receiving the request, in applying operation 206 to the present example, the spreadsheet application 813 identifies the affected cells. In the present example, the spreadsheet application 813 is configured to identify the cells of the table 605 that are within the column that is selected by the user. Thus, in applying the data of the present example, when the user touches the grid header 615 of column E, the cells of column E in rows 1-10 are identified as the affected cells.

Next, in applying operation 210 to the present example, the spreadsheet application 813 displays a visual indicator that emphasizes the affected cells. In the present example, since the affect cells include the cells in rows 1-10 of column E, the touch-enabled screen 602 displays a visual indicator to bring attention to those cells. FIG. 6C illustrates one embodiment of a visual indicator configured to bring attention to the affect cells. Specifically, FIG. 6C illustrates a border 614 that brings attention to cells E1 through E10. As described above, the visual indicator displayed in operation 210 may include any form, shape, shade, color, graphic or other object that may bring attention to the affected cells. Thus, although a border 614 is used in the illustrative example of FIG. 6C, this example should not be construed as limiting.

Figure 6D:
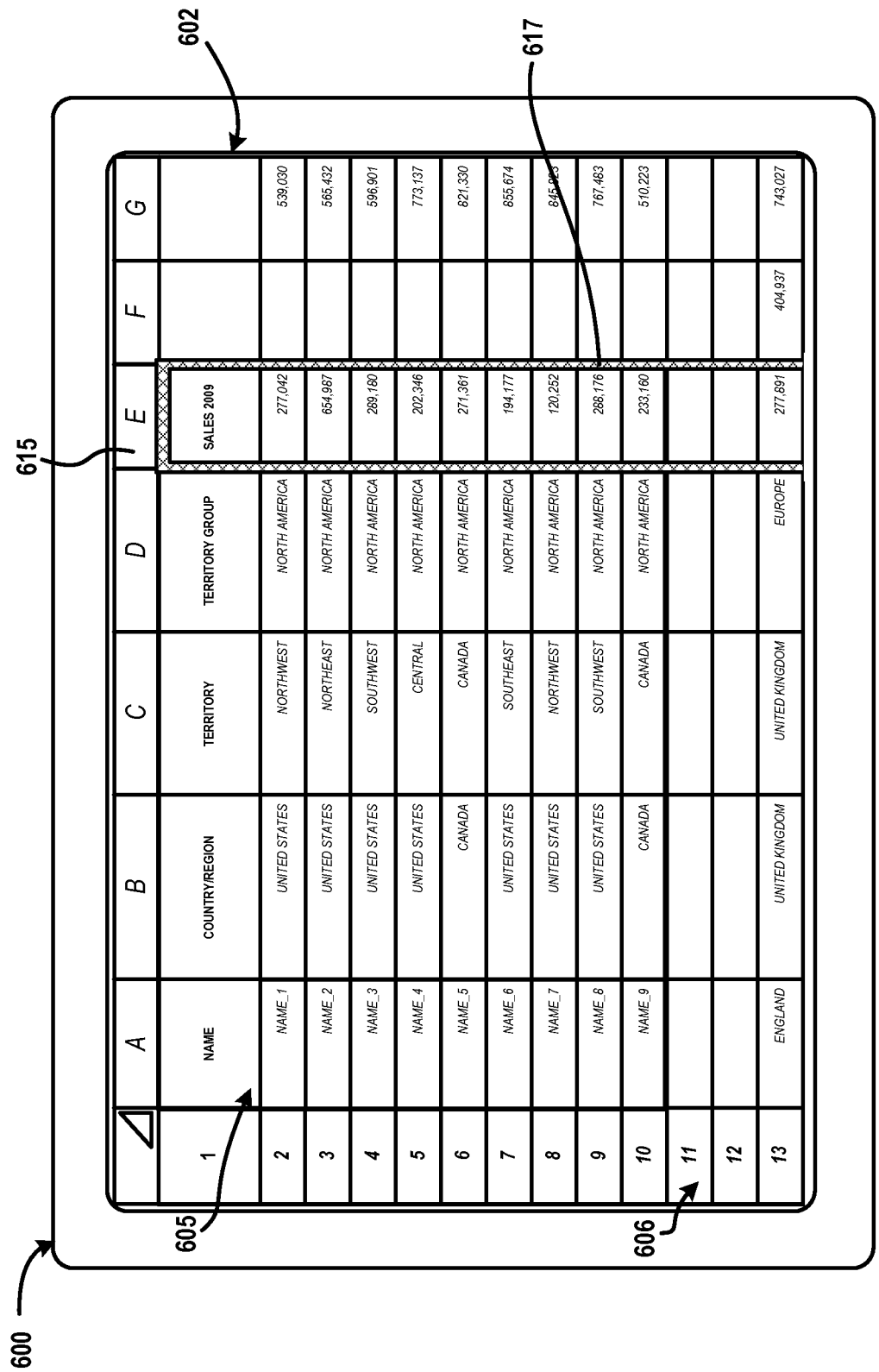

In embodiments disclosed herein, the above-described process may include additional features that allow users to select additional cells of the spreadsheet 606. In such an embodiment, the spreadsheet application 813 may be configured to toggle the user's selection between the cells of the table 605 and the cells of the spreadsheet 606. For example, when the user touches the grid header of a desired column for the first time, the touch-enabled screen 602 displays a visual indicator, such as the border 614 shown in FIG. 6C, to bring attention to the cells of the table 605. When the user touches the grid header a second time, the spreadsheet application 813 displays a second border 617, as shown in FIG. 6D, to bring attention to the cells of the spreadsheet 606. As shown, the second border 617 is not limited to the cells of the table 605. In such an embodiment, with each touch of the grid header 615, the spreadsheet application 813 may be configured to toggle between the visual indicators shown in FIGS. 6C and 6D.

As described above, embodiments described herein are used to identify cells that are affected by an operation. Some of the examples described herein involve techniques where the identification of the affected cells is based on the cells of a table, such as table 104. As also summarized above, other embodiments for identifying affected cells may not depend on a table. In such embodiments, for example, techniques for identifying affected cells may involve the analysis of cells of a spreadsheet, wherein patterns or groupings of data are used to identify affected cells.

Referring to FIGS. 7A and 7B, an illustrative embodiment for displaying visual indicators for affected cells is shown and described. FIG. 7A shows a spreadsheet 700 that includes a number of cells populated with a variety of data entries. For illustrative purposes, the spreadsheet 700 includes a selected cell 702, cell H4. In the present example, the spreadsheet application 813 is configured to identify cells that are grouped in a particular manner with respect to the selected cell 702. Thus, given a selected cell, if an operation is invoked by the user, the spreadsheet application 813 may identify the affected cells based on the pattern of data entries around the selected cell.

In example shown in FIG. 7A, given that H4 is the selected cell, the spreadsheet application 813 identifies cells H2-H10 as affected cells because of the grouping of data entries in cells H2-H10, having empty data entries in cell H1 and cell H11. FIG. 7B shows one example of a visual indicator that brings attention to the affected cells. As shown in FIG. 7B, the visual indicator is in the form of a border 703. As can be appreciated, the visual indicator may include any form, shape, shade, color, graphic or other object that may bring attention to the affected cells. Thus, although the border 703 is used in the illustrative example of FIG. 7B, this embodiment should not be construed as limiting.

Figure 8:
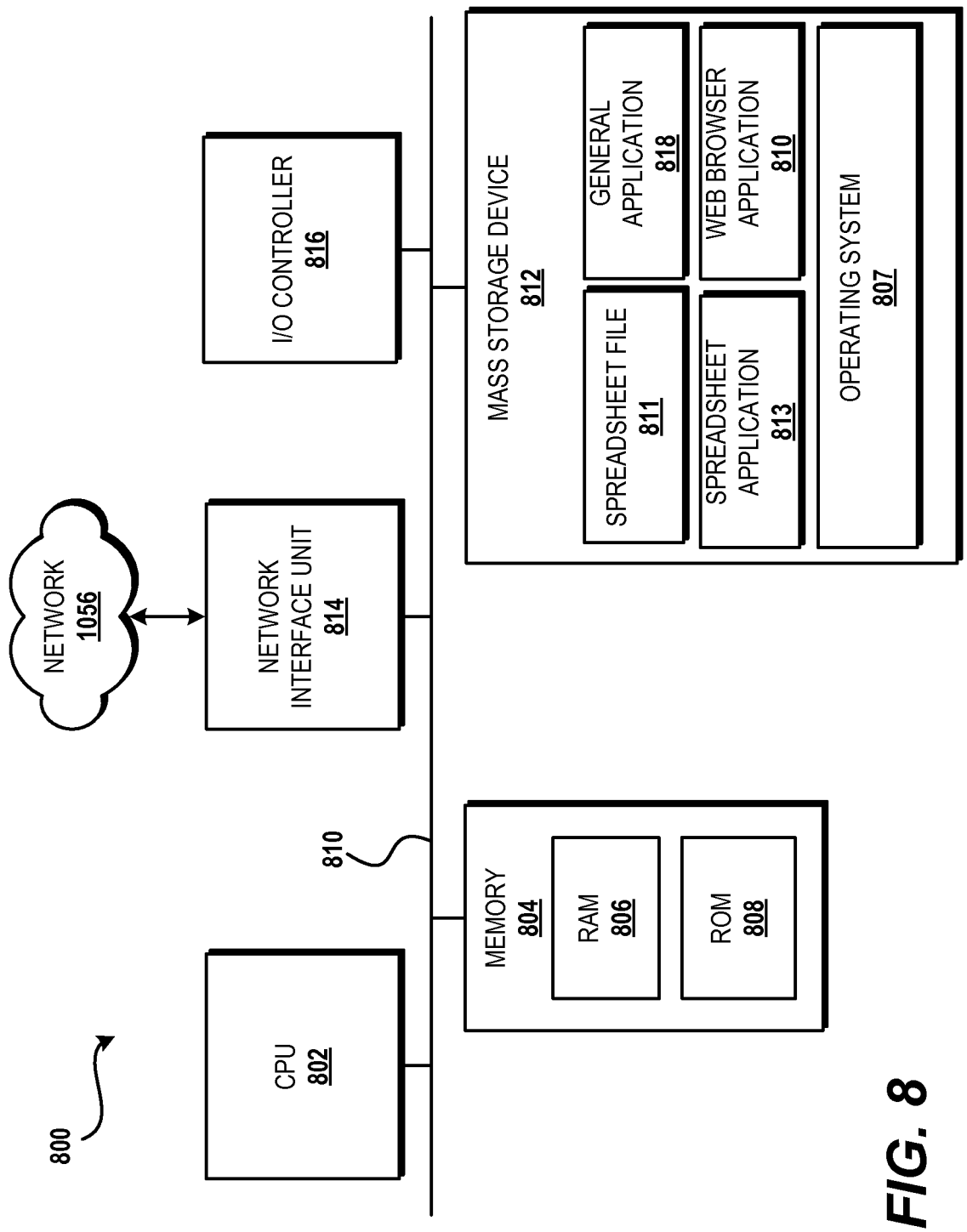
FIG. 8 is a computer architecture diagram illustrating an illustrative computer hardware and software architecture for a computing system capable of implementing aspects of the embodiments presented herein.

FIG. 8 illustrates an illustrative computer architecture 800 for a device capable of executing the software components described herein for displaying one or more visual indicators that emphasize affected cells of a spreadsheet. Thus, the computer architecture 800 illustrated in FIG. 8 illustrates an architecture for a server computer, mobile phone, a PDA, a smart phone, a desktop computer, a netbook computer, a tablet computer, and/or a laptop computer. The computer architecture 800 may be utilized to execute any aspects of the software components presented herein.

The computer architecture 800 illustrated in FIG. 8 includes a central processing unit 802 ("CPU"), a system memory 804, including a random access memory 806 ("RAM") and a read-only memory ("ROM") 808, and a system bus 810 that couples the memory 804 to the CPU 802. A basic input/output system containing the basic routines that help to transfer information between elements within the computer architecture 800, such as during startup, is stored in the ROM 808. The computer architecture 800 further includes a mass storage device 812 for storing an operating system 807, and one or more application programs including, but not limited to, the spreadsheet application 813, the general application program 818, and the web browser application 810. The illustrated mass storage device 812 may also store a spreadsheet file 811.

The mass storage device 812 is connected to the CPU 802 through a mass storage controller (not shown) connected to the bus 810. The mass storage device 812 and its associated computer-readable media provide non-volatile storage for the computer architecture 800. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 800. For purposes the claims, the phrase "computer storage medium," "computer-readable storage medium" and variations thereof, does not include waves, signals, and/or other transitory and/or intangible communication media, per se.

According to various embodiments, the computer architecture 800 may operate in a networked environment using logical connections to remote computers through the network 1056 and/or another network (not shown). The computer architecture 800 may connect to the network 1056 through a network interface unit 814 connected to the bus 810. It should be appreciated that the network interface unit 814 also may be utilized to connect to other types of networks and remote computer systems. The computer architecture 800 also may include an input/output controller 816 for receiving and processing input from a number of other devices, including a keyboard, mouse, or electronic stylus (not shown in FIG. 8). Similarly, the input/output controller 816 may provide output to a display screen, a printer, or other type of output device (also not shown in FIG. 8).

It should be appreciated that the software components described herein may, when loaded into the CPU 802 and executed, transform the CPU 802 and the overall computer architecture 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 800 in order to store and execute the software components presented herein. It also should be appreciated that the computer architecture 800 may include other types of computing devices, including hand-held computers, embedded computer systems, personal digital assistants, and other types of computing devices known to those skilled in the art. It is also contemplated that the computer architecture 800 may not include all of the components shown in FIG. 8, may include other components that are not explicitly shown in FIG. 8, or may utilize an architecture completely different than that shown in FIG. 8.

Figure 9:
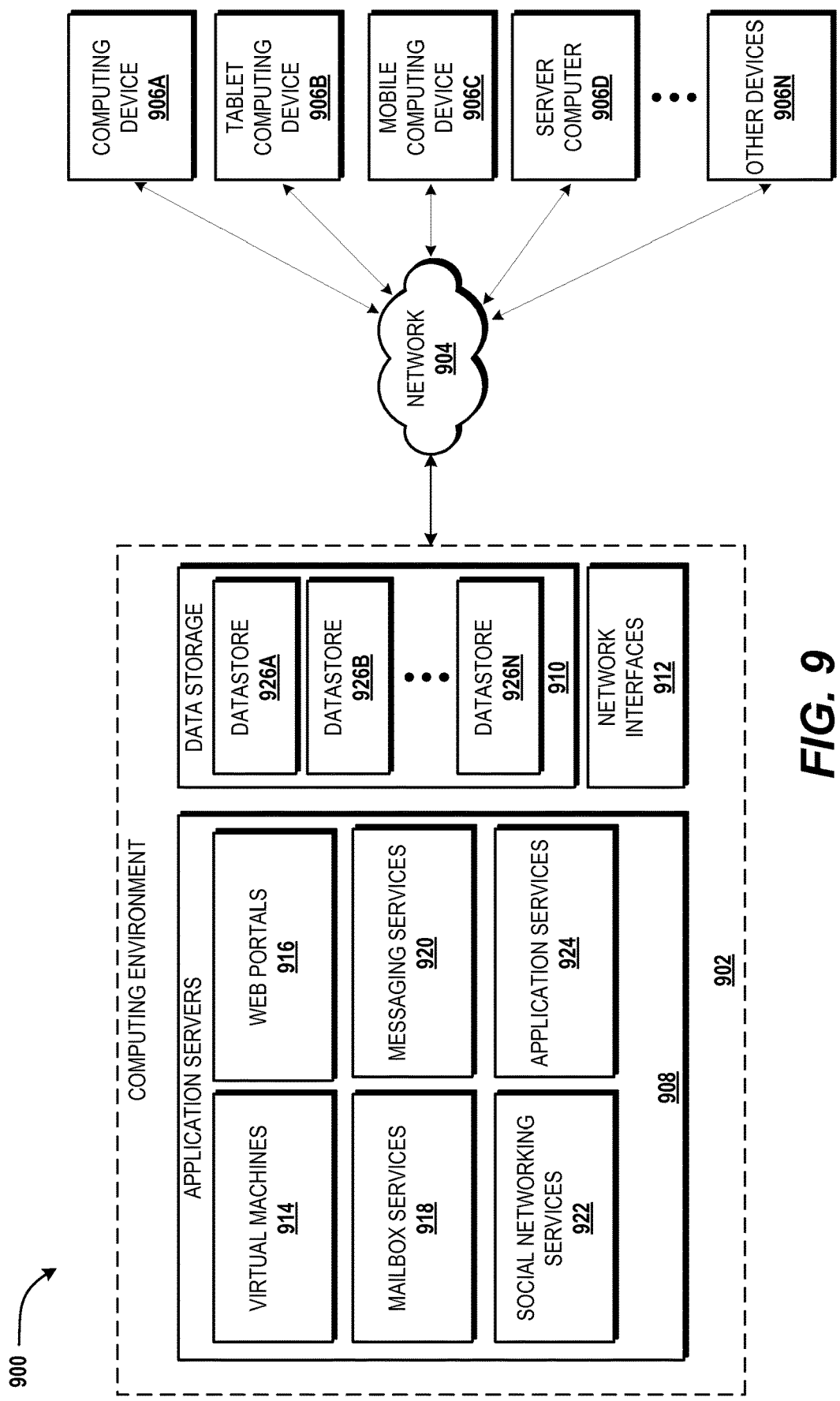
FIG. 9 is a diagram illustrating a distributed computing environment capable of implementing aspects of the embodiments presented herein.

FIG. 9 depicts an illustrative distributed computing environment 900 capable of executing the software components described herein for displaying one or more visual indicators to assist users in identifying cells of a spreadsheet that are affected by an operation, among other aspects. Thus, the distributed computing environment 900 illustrated in FIG. 9 can be utilized to execute any aspects of the software components presented herein. For example, the distributed computing environment 900 can be utilized to execute aspects of the spreadsheet application 813, the general application 818 and/or other software components described herein.

According to various implementations, the distributed computing environment 900 includes a computing environment 902 operating on, in communication with, or as part of the network 904. The network 904 may be or may include the network 1056, described above with reference to FIG. 8. The network 904 also can include various access networks. One or more client devices 906A-906N (hereinafter referred to collectively and/or generically as "clients 906") can communicate with the computing environment 902 via the network 904 and/or other connections (not illustrated in FIG. 9). In the illustrated embodiment, the clients 906 include a computing device 906A such as a laptop computer, a desktop computer, or other computing device; a slate or tablet computing device ("tablet computing device") 906B; a mobile computing device 906C such as a mobile telephone, a smart phone, or other mobile computing device; a server computer 906D; and/or other devices 906N. It should be understood that any number of clients 906 can communicate with the computing environment 902. Two example computing architectures for the clients 906 are illustrated and described herein with reference to FIGS. 8 and 10. It should be understood that the illustrated clients 906 and computing architectures illustrated and described herein are illustrative, and should not be construed as being limited in any way.

In the illustrated embodiment, the computing environment 902 includes application servers 908, data storage 910, and one or more network interfaces 912. According to various implementations, the functionality of the application servers 908 can be provided by one or more server computers that are executing as part of, or in communication with, the network 904. The application servers 908 can host various services, virtual machines, portals, and/or other resources. In the illustrated embodiment, the application servers 908 host one or more virtual machines 914 for hosting applications or other functionality. According to various implementations, the virtual machines 914 host one or more applications and/or software modules for providing the functionality described herein for displaying one or more visual indicators to assist users in identifying cells that are affected by an operation. It should be understood that this embodiment is illustrative, and should not be construed as being limiting in any way. The application servers 908 also host or provide access to one or more Web portals, link pages, Web sites, and/or other information ("Web portals") 916.

According to various implementations, the application servers 908 also include one or more mailbox services 918 and one or more messaging services 920. The mailbox services 918 can include electronic mail ("email") services. The mailbox services 918 also can include various personal information management ("PIM") services including, but not limited to, calendar services, contact management services, collaboration services, and/or other services. The messaging services 920 can include, but are not limited to, instant messaging services, chat services, forum services, and/or other communication services.

The application servers 908 also may include one or more social networking services 922. The social networking services 922 can include various social networking services including, but not limited to, services for sharing or posting status updates, instant messages, links, photos, videos, and/or other information; services for commenting or displaying interest in articles, products, blogs, or other resources; and/or other services. In some embodiments, the social networking services 922 are provided by or include the FACEBOOK social networking service, the LINKEDIN professional networking service, the MYSPACE social networking service, the FOURSQUARE geographic networking service, the YAMMER office colleague networking service, and the like. In other embodiments, the social networking services 922 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 922 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 922 are not mentioned herein for the sake of brevity. As such, the above embodiments are illustrative, and should not be construed as being limited in any way. According to various implementations, the social networking services 922 may host one or more applications and/or software modules for providing the functionality described herein for displaying one or more visual indicators to assist users in identifying cells that are affected by an operation.

As shown in FIG. 9, the application servers 908 also can host other services, applications, portals, and/or other resources ("other resources") 924. The other resources 924 can include, but are not limited to, the presentation application program. It thus can be appreciated that the computing environment 902 can provide integration of the concepts and technologies disclosed herein provided herein with various mailbox, messaging, social networking, and/or other services or resources.

As mentioned above, the computing environment 902 can include the data storage 910. According to various implementations, the functionality of the data storage 910 is provided by one or more databases operating on, or in communication with, the network 904. The functionality of the data storage 910 also can be provided by one or more server computers configured to host data for the computing environment 902. The data storage 910 can include, host, or provide one or more real or virtual datastores 926A-926N (hereinafter referred to collectively and/or generically as "datastores 926"). The datastores 926 are configured to host data used or created by the application servers 813 and/or other data. Although not illustrated in FIG. 9, the datastores 926 also can host or store spreadsheet documents, algorithm for execution by a recommendation engine, and/or other data utilized by a spreadsheet application program.

The computing environment 902 can communicate with, or be accessed by, the network interfaces 912. The network interfaces 912 can include various types of network hardware and software for supporting communications between two or more computing devices including, but not limited to, the clients 906 and the application servers 908. It should be appreciated that the network interfaces 912 also may be utilized to connect to other types of networks and/or computer systems.

It should be understood that the distributed computing environment 900 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 900 provides the software functionality described herein as a service to the clients 906. It should be understood that the clients 906 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 900 to utilize the functionality described herein for displaying one or more visual indicators to assist users in identifying cells of a spreadsheet that are affected by an operation, among other aspects. In one specific example, as summarized above, techniques described herein may be implemented, at least in part, by the web browser application 810 of FIG. 8, which works in conjunction with the application service 924 of FIG. 9.

Figure 10:
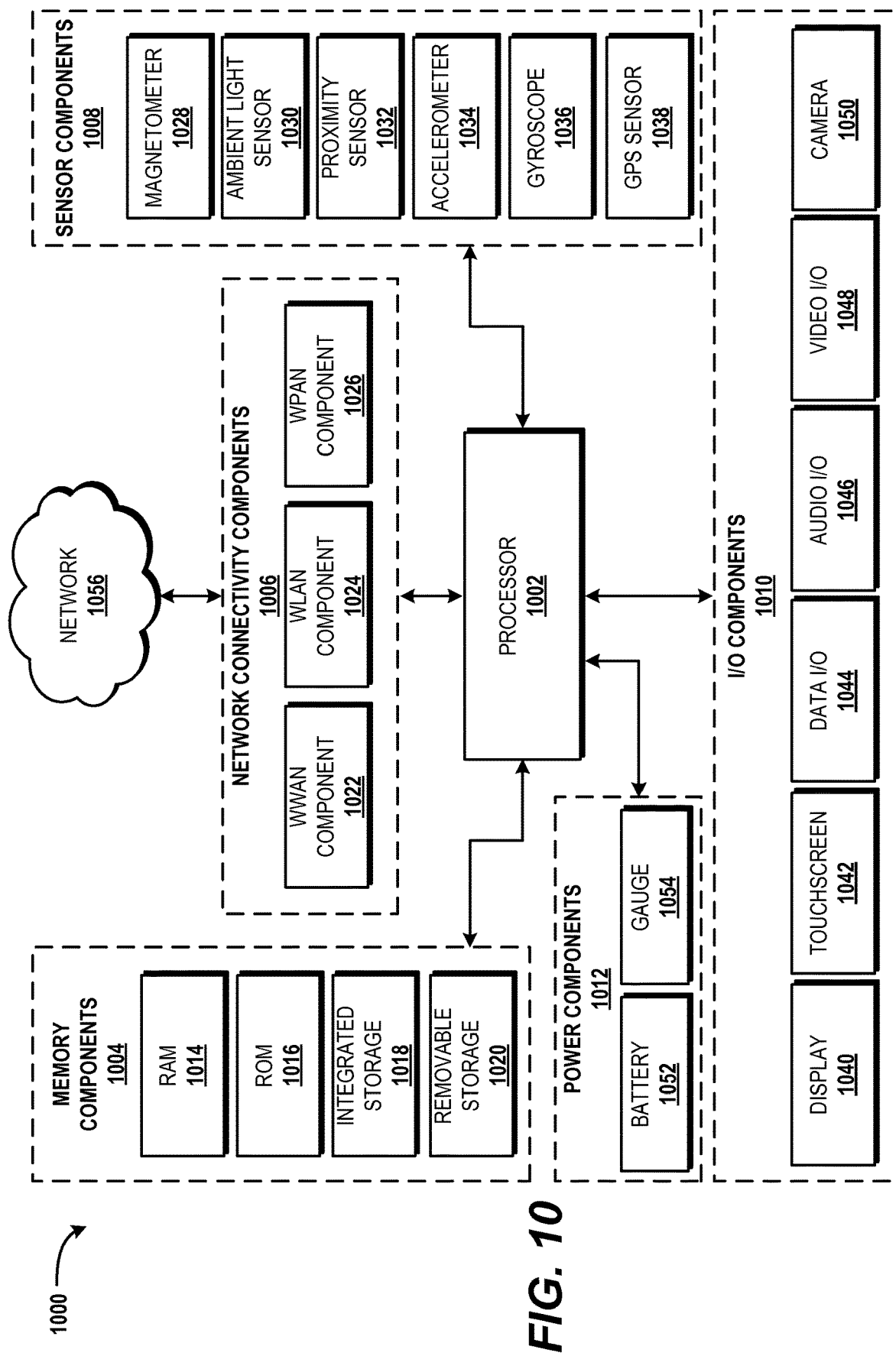
FIG. 10 is a computer architecture diagram illustrating a computing device architecture for a computing device capable of implementing aspects of the embodiments presented herein.

Turning now to FIG. 10, an illustrative computing device architecture 1000 for a computing device that is capable of executing various software components described herein for displaying one or more visual indicators to assist users in identifying cells of a spreadsheet that are affected by an operation. The computing device architecture 1000 is applicable to computing devices that facilitate mobile computing due, in part, to form factor, wireless connectivity, and/or battery-powered operation. In some embodiments, the computing devices include, but are not limited to, mobile telephones, tablet devices, slate devices, portable video game devices, and the like. The computing device architecture 1000 is applicable to any of the clients 906 shown in FIG. 9. Moreover, aspects of the computing device architecture 1000 may be applicable to traditional desktop computers, portable computers (e.g., laptops, notebooks, ultra-portables, and netbooks), server computers, and other computer systems, such as described herein with reference to FIG. 8. For example, the single touch and multi-touch aspects disclosed herein below may be applied to desktop computers that utilize a touchscreen or some other touch-enabled device, such as a touch-enabled track pad or touch-enabled mouse.

The computing device architecture 1000 illustrated in FIG. 10 includes a processor 1002, memory components 1004, network connectivity components 1006, sensor components 1008, input/output components 1010, and power components 1012. In the illustrated embodiment, the processor 1002 is in communication with the memory components 1004, the network connectivity components 1006, the sensor components 1008, the input/output ("I/O") components 1010, and the power components 1012. Although no connections are shown between the individuals components illustrated in FIG. 10, the components can interact to carry out device functions. In some embodiments, the components are arranged so as to communicate via one or more busses (not shown).

The processor 1002 includes a central processing unit ("CPU") configured to process data, execute computer-executable instructions of one or more application programs, and communicate with other components of the computing device architecture 1000 in order to perform various functionality described herein. The processor 1002 may be utilized to execute aspects of the software components presented herein and, particularly, those that utilize, at least in part, a touch-enabled input.

In some embodiments, the processor 1002 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some embodiments, the processor 1002 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some embodiments, the processor 1002 is, or is included in, a system-on-chip ("SoC") along with one or more of the other components described herein below. For example, the SoC may include the processor 1002, a GPU, one or more of the network connectivity components 1006, and one or more of the sensor components 1008. In some embodiments, the processor 1002 is fabricated, in part, utilizing a package-on-package ("PoP") integrated circuit packaging technique. The processor 1002 may be a single core or multi-core processor.

The processor 1002 may be created in accordance with an ARM architecture, available for license from ARM HOLDINGS of Cambridge, United Kingdom. Alternatively, the processor 1002 may be created in accordance with an x86 architecture, such as is available from INTEL CORPORATION of Mountain View, Calif. and others. In some embodiments, the processor 1002 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1004 include a random access memory ("RAM") 1014, a read-only memory ("ROM") 1016, an integrated storage memory ("integrated storage") 1018, and a removable storage memory ("removable storage") 1020. In some embodiments, the RAM 1014 or a portion thereof, the ROM 1018 or a portion thereof, and/or some combination the RAM 1014 and the ROM 1018 is integrated in the processor 1002. In some embodiments, the ROM 1018 is configured to store a firmware, an operating system or a portion thereof (e.g., operating system kernel), and/or a bootloader to load an operating system kernel from the integrated storage 1018 and/or the removable storage 1020.

The integrated storage 1018 can include a solid-state memory, a hard disk, or a combination of solid-state memory and a hard disk. The integrated storage 1018 may be soldered or otherwise connected to a logic board upon which the processor 1002 and other components described herein also may be connected. As such, the integrated storage 1018 is integrated in the computing device. The integrated storage 1018 is configured to store an operating system or portions thereof, application programs, data, and other software components described herein.

The removable storage 1020 can include a solid-state memory, a hard disk, or a combination of solid-state memory and a hard disk. In some embodiments, the removable storage 1020 is provided in lieu of the integrated storage 1018. In other embodiments, the removable storage 1020 is provided as additional optional storage. In some embodiments, the removable storage 1020 is logically combined with the integrated storage 1018 such that the total available storage is made available as a total combined storage capacity. In some embodiments, the total combined capacity of the integrated storage 1018 and the removable storage 1020 is shown to a user instead of separate storage capacities for the integrated storage 1018 and the removable storage 1020.

The removable storage 1020 is configured to be inserted into a removable storage memory slot (not shown) or other mechanism by which the removable storage 1020 is inserted and secured to facilitate a connection over which the removable storage 1020 can communicate with other components of the computing device, such as the processor 1002. The removable storage 1020 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1004 can store an operating system. According to various embodiments, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 1006 include a wireless wide area network component ("WWAN component") 1022, a wireless local area network component ("WLAN component") 1024, and a wireless personal area network component ("WPAN component") 1026. The network connectivity components 1006 facilitate communications to and from the network 1056 or another network, which may be a WWAN, a WLAN, or a WPAN. Although only the network 1056 is illustrated, the network connectivity components 1006 may facilitate simultaneous communication with multiple networks, including the network 904 of FIG. 9. For example, the network connectivity components 1006 may facilitate simultaneous communications with multiple networks via one or more of a WWAN, a WLAN, or a WPAN.

The network 1056 may be or may include a WWAN, such as a mobile telecommunications network utilizing one or more mobile telecommunications technologies to provide voice and/or data services to a computing device utilizing the computing device architecture 1000 via the WWAN component 1022. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 1056 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 104 may be configured to provide voice and/or data communications with any combination of the above technologies. The network 1056 may be configured to or adapted to provide voice and/or data communications in accordance with future generation technologies.

In some embodiments, the WWAN component 1022 is configured to provide dual-multi-mode connectivity to the network 1056. For example, the WWAN component 1022 may be configured to provide connectivity to the network 1056, wherein the network 1056 provides service via GSM and UMTS technologies, or via some other combination of technologies. Alternatively, multiple WWAN components 1022 may be utilized to perform such functionality, and/or provide additional functionality to support other non-compatible technologies (i.e., incapable of being supported by a single WWAN component). The WWAN component 1022 may facilitate similar connectivity to multiple networks (e.g., a UMTS network and an LTE network).

The network 1056 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN is implemented utilizing one or more wireless WI-FI access points. In some embodiments, one or more of the wireless WI-FI access points are another computing device with connectivity to a WWAN that are functioning as a WI-FI hotspot. The WLAN component 1024 is configured to connect to the network 1056 via the WI-FI access points. Such connections may be secured via various encryption technologies including, but not limited, WI-FI Protected Access ("WPA"), WPA2, Wired Equivalent Privacy ("WEP"), and the like.

The network 1056 may be a WPAN operating in accordance with Infrared Data Association ("IrDA"), BLUETOOTH, wireless Universal Serial Bus ("USB"), Z-Wave, ZIGBEE, or some other short-range wireless technology. In some embodiments, the WPAN component 1026 is configured to facilitate communications with other devices, such as peripherals, computers, or other computing devices via the WPAN.

The sensor components 1008 include a magnetometer 1028, an ambient light sensor 1030, a proximity sensor 1032, an accelerometer 1034, a gyroscope 1036, and a Global Positioning System sensor ("GPS sensor") 1038. It is contemplated that other sensors, such as, but not limited to, temperature sensors or shock detection sensors, also may be incorporated in the computing device architecture 1000.

The magnetometer 1028 is configured to measure the strength and direction of a magnetic field. In some embodiments the magnetometer 1028 provides measurements to a compass application program stored within one of the memory components 1004 in order to provide a user with accurate directions in a frame of reference including the cardinal directions, north, south, east, and west. Similar measurements may be provided to a navigation application program that includes a compass component. Other uses of measurements obtained by the magnetometer 1028 are contemplated.

The ambient light sensor 1030 is configured to measure ambient light. In some embodiments, the ambient light sensor 1030 provides measurements to an application program stored within one the memory components 1004 in order to automatically adjust the brightness of a display (described below) to compensate for low-light and high-light environments. Other uses of measurements obtained by the ambient light sensor 1030 are contemplated.

The proximity sensor 1032 is configured to detect the presence of an object or thing in proximity to the computing device without direct contact. In some embodiments, the proximity sensor 1032 detects the presence of a user's body (e.g., the user's face) and provides this information to an application program stored within one of the memory components 1004 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 1028 are contemplated.

The accelerometer 1034 is configured to measure proper acceleration. In some embodiments, output from the accelerometer 1034 is used by an application program as an input mechanism to control some functionality of the application program. For example, the application program may be a video game in which a character, a portion thereof, or an object is moved or otherwise manipulated in response to input received via the accelerometer 1034. In some embodiments, output from the accelerometer 1034 is provided to an application program for use in switching between landscape and portrait modes, calculating coordinate acceleration, or detecting a fall. Other uses of the accelerometer 1034 are contemplated.

The gyroscope 1036 is configured to measure and maintain orientation. In some embodiments, output from the gyroscope 1036 is used by an application program as an input mechanism to control some functionality of the application program. For example, the gyroscope 1036 can be used for accurate recognition of movement within a 3D environment of a video game application or some other application. In some embodiments, an application program utilizes output from the gyroscope 1036 and the accelerometer 1034 to enhance control of some functionality of the application program. Other uses of the gyroscope 1036 are contemplated.

The GPS sensor 1038 is configured to receive signals from GPS satellites for use in calculating a location. The location calculated by the GPS sensor 1038 may be used by any application program that requires or benefits from location information. For example, the location calculated by the GPS sensor 1038 may be used with a navigation application program to provide directions from the location to a destination or directions from the destination to the location. Moreover, the GPS sensor 1038 may be used to provide location information to an external location-based service, such as E911 service. The GPS sensor 1038 may obtain location information generated via WI-FI, WIMAX, and/or cellular triangulation techniques utilizing one or more of the network connectivity components 1006 to aid the GPS sensor 1038 in obtaining a location fix. The GPS sensor 1038 may also be used in Assisted GPS ("A-GPS") systems.

The I/O components 1010 include a display 1040, a touchscreen 1042, a data I/O interface component ("data I/O") 1044, an audio I/O interface component ("audio I/O") 1046, a video I/O interface component ("video I/O") 1048, and a camera 1050. In some embodiments, the display 1040 and the touchscreen 1042 are combined. In some embodiments two or more of the data I/O component 1044, the audio I/O component 1046, and the video I/O component 1048 are combined. The I/O components 1010 may include discrete processors configured to support the various interface described below, or may include processing functionality built-in to the processor 1002.

The display 1040 is an output device configured to present information in a visual form. In particular, the display 1040 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some embodiments, the display 1040 is a liquid crystal display ("LCD") utilizing any active or passive matrix technology and any backlighting technology (if used). In some embodiments, the display 1040 is an organic light emitting diode ("OLED") display. Other display types are contemplated.

The touchscreen 1042, also referred to herein as a "touch-enabled screen," is an input device configured to detect the presence and location of a touch. The touchscreen 1042 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen 1042 is incorporated on top of the display 1040 as a transparent layer to enable a user to use one or more touches to interact with objects or other information presented on the display 1040. In other embodiments, the touchscreen 1042 is a touch pad incorporated on a surface of the computing device that does not include the display 1040. For example, the computing device may have a touchscreen incorporated on top of the display 1040 and a touch pad on a surface opposite the display 1040.

In some embodiments, the touchscreen 1042 is a single-touch touchscreen. In other embodiments, the touchscreen 1042 is a multi-touch touchscreen. In some embodiments, the touchscreen 1042 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 1042. As such, a developer may create gestures that are specific to a particular application program.

In some embodiments, the touchscreen 1042 supports a tap gesture in which a user taps the touchscreen 1042 once on an item presented on the display 1040. The tap gesture may be used for various reasons including, but not limited to, opening or launching whatever the user taps. In some embodiments, the touchscreen 1042 supports a double tap gesture in which a user taps the touchscreen 1042 twice on an item presented on the display 1040. The double tap gesture may be used for various reasons including, but not limited to, zooming in or zooming out in stages. In some embodiments, the touchscreen 1042 supports a tap and hold gesture in which a user taps the touchscreen 1042 and maintains contact for at least a pre-defined time. The tap and hold gesture may be used for various reasons including, but not limited to, opening a context-specific menu.

In some embodiments, the touchscreen 1042 supports a pan gesture in which a user places a finger on the touchscreen 1042 and maintains contact with the touchscreen 1042 while moving the finger on the touchscreen 1042. The pan gesture may be used for various reasons including, but not limited to, moving through screens, images, or menus at a controlled rate. Multiple finger pan gestures are also contemplated. In some embodiments, the touchscreen 1042 supports a flick gesture in which a user swipes a finger in the direction the user wants the screen to move. The flick gesture may be used for various reasons including, but not limited to, scrolling horizontally or vertically through menus or pages. In some embodiments, the touchscreen 1042 supports a pinch and stretch gesture in which a user makes a pinching motion with two fingers (e.g., thumb and forefinger) on the touchscreen 1042 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 1042. As such, the above gestures should be understood as being illustrative and should not be construed as being limiting in any way.

The data I/O interface component 1044 is configured to facilitate input of data to the computing device and output of data from the computing device. In some embodiments, the data I/O interface component 1044 includes a connector configured to provide wired connectivity between the computing device and a computer system, for example, for synchronization operation purposes. The connector may be a proprietary connector or a standardized connector such as USB, micro-USB, mini-USB, or the like. In some embodiments, the connector is a dock connector for docking the computing device with another device such as a docking station, audio device (e.g., a digital music player), or video device.

The audio I/O interface component 1046 is configured to provide audio input and/or output capabilities to the computing device. In some embodiments, the audio I/O interface component 1044 includes a microphone configured to collect audio signals. In some embodiments, the audio I/O interface component 1044 includes a headphone jack configured to provide connectivity for headphones or other external speakers. In some embodiments, the audio I/O interface component 1046 includes a speaker for the output of audio signals. In some embodiments, the audio I/O interface component 1044 includes an optical audio cable out.

The video I/O interface component 1048 is configured to provide video input and/or output capabilities to the computing device. In some embodiments, the video I/O interface component 1048 includes a video connector configured to receive video as input from another device (e.g., a video media player such as a DVD or BLURAY player) or send video as output to another device (e.g., a monitor, a television, or some other external display). In some embodiments, the video I/O interface component 1048 includes a High-Definition Multimedia Interface ("HDMI"), mini-HDMI, micro-HDMI, DisplayPort, or proprietary connector to input/output video content. In some embodiments, the video I/O interface component 1048 or portions thereof is combined with the audio I/O interface component 1046 or portions thereof.

The camera 1050 can be configured to capture still images and/or video. The camera 1050 may utilize a charge coupled device ("CCD") or a complementary metal oxide semiconductor ("CMOS") image sensor to capture images. In some embodiments, the camera 1050 includes a flash to aid in taking pictures in low-light environments. Settings for the camera 1050 may be implemented as hardware or software buttons.

Although not illustrated, one or more hardware buttons may also be included in the computing device architecture 1000. The hardware buttons may be used for controlling some operational aspect of the computing device. The hardware buttons may be dedicated buttons or multi-use buttons. The hardware buttons may be mechanical or sensor-based.

The illustrated power components 1012 include one or more batteries 1052, which can be connected to a battery gauge 1054. The batteries 1052 may be rechargeable or disposable. Rechargeable battery types include, but are not limited to, lithium polymer, lithium ion, nickel cadmium, and nickel metal hydride. Each of the batteries 1052 may be made of one or more cells.

The battery gauge 1054 can be configured to measure battery parameters such as current, voltage, and temperature. In some embodiments, the battery gauge 1054 is configured to measure the effect of a battery's discharge rate, temperature, age and other factors to predict remaining life within a certain percentage of error. In some embodiments, the battery gauge 1054 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 1012 may also include a power connector, which may be combined with one or more of the aforementioned I/O components 1010. The power components 1012 may interface with an external power system or charging equipment via a power I/O component 1042.

Based on the foregoing, it should be appreciated that concepts and technologies have been disclosed herein that display one or more visual indicators to assist users in identifying cells of a spreadsheet that are affected by an operation. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method comprising computer-implemented operations for:
   displaying a spreadsheet comprising a table having a first plurality of cells and a second plurality of cells unassociated with the table;
   receiving a request to perform an operation that, once performed, will affect one or more cells of the spreadsheet;
   prior to performing the operation, displaying a first visual indicator to identify which cells of the spreadsheet will be affected by the operation once it is performed, the first visual indicator thereby delineating a scope of the operation to be performed so that a user can ascertain whether the operation will affect cells within the table, cells unassociated with the table, or both;
   performing the operation; and
   following performance of the operation, displaying a second visual indicator to identify the cells of the spreadsheet that have been affected by the operation, wherein the second visual indicator changes the first visual indicator or is displayed after the first visual indicator is removed.

2. The computer-implemented method of claim 1, wherein the first visual indicator is removed after a predetermined time period after the request is received to perform the operation.

3. The computer-implemented method of claim 1, further comprising:
   prior to or during performing the operation, removing the first visual indicator displayed to identify the one or more of the plurality of cells of the spreadsheet affected by the operation;
   and
   following performance of the operation, displaying the second visual indicator to identify the one or more of the plurality of cells of the spreadsheet affected by the operation.

4. The computer-implemented method of claim 1, wherein displaying the first visual indicator or the second visual indicator comprises highlighting a border of the one or more of the plurality of cells of the spreadsheet affected by the operation.

5. The computer-implemented method of claim 1, wherein displaying the first visual indicator or the second visual indicator comprises generating an animation that varies in thickness, wherein the animation highlights a border of the one or more of the plurality of cells of the spreadsheet affected by the operation.

6. The computer-implemented method of claim 1, wherein displaying the first visual indicator or the second visual indicator comprises generating an animation which varies in color, wherein the animation highlights a border of one or more of the plurality of cells of the spreadsheet affected by the operation.

7. The computer-implemented method of claim 1, wherein displaying the first visual indicator or the second visual indicator comprises generating an animation which varies in color and thickness, wherein the animation highlights a border of the one or more of the plurality of cells of the spreadsheet affected by the operation.

8. The computer-implemented method of claim 1, wherein displaying the first visual indicator or the second visual indicator comprises shading the one or more of the plurality of cells of the spreadsheet affected by the operation.

9. The computer-implemented method of claim 1, wherein displaying the first visual indicator or the second visual indicator comprises shading one or more column and row headers associated with the one or more of the plurality of cells of the spreadsheet affected by the operation.

10. The computer-implemented method of claim 1, wherein the one or more of the plurality of cells affected by the operation is identified based on pattern of data entries around a selected cell.

11. A computer, comprising:
   a processor; and
   a computer-readable storage medium in communication with the processor, the computer-readable storage medium having computer-executable instructions stored thereupon which, when executed by the processor, cause the processor to display a plurality of cells of a table contained within a plurality of cells of a spreadsheet, receive a request to perform an operation on at least one of the plurality of cells of the table, in response to receiving the request to perform the operation and prior to performance of the operation, identify one or more of the plurality of cells of the table affected by the operation, and display a visual indicator to specify as a visibly discernable group the one or more of the plurality of cells of the table affected by the operation;

performing the operation; and following performance of the operation, display a second visual indicator to identify the one or more of the plurality of cells of the spreadsheet affected by the operation, wherein the second visual indicator changes the visual indicator or is displayed after the visual indicator is removed.

12. The computer of claim 11, wherein the visual indicator is removed after a pre-determined time period.

13. The computer of claim 11, the computer-readable medium having further computer-executable instructions stored thereupon which, when executed by the processor, cause the processor to:

prior to or during performing the operation, remove the visual indicator; and following performance of the operation, display the second visual indicator to identify the one or more of the plurality of cells of the table affected by the operation.

14. The computer of claim 11, wherein the display of the visual indicator comprises highlighting a border of the one or more of the plurality of cells of the table affected by the operation.

15. The computer of claim 11, wherein the display of the visual indicator comprises generating an animation that varies in thickness, wherein the animation highlights a border of the one or more of the plurality of cells of the table affected by the operation.

16. The computer of claim 11, wherein the display of the visual indicator comprises generating an animation which varies in color, wherein the animation highlights a border of one or more of the plurality of cells of the table affected by the operation.

17. The computer of claim 11, wherein the one or more of the plurality of cells affected by the operation is identified based on pattern of data entries around a selected cell.

18. A computer-readable storage medium having computer-executable instructions stored thereupon which, when executed by a computer, cause the computer to:

display a spreadsheet comprising a plurality of cells and a table, wherein the table comprises a selection of cells of the plurality of cells, and wherein the selection of cells of the table has one or more associations that are independent from remaining cells of the plurality of cells of the spreadsheet;

receive a request to perform an operation on at least one of the selection of cells of the table;

in response to receiving the request to perform the operation and prior to performing the operation, identify one or more of the plurality of cells affected by the operation display a visual indicator to identify as a visibly discernable group the one or more of the plurality of cells of the table affected by the operation;

performing the operation; and following performance of the operation, display a second visual indicator to identify the one or more of the plurality of cells of the spreadsheet affected by the operation, wherein the second visual indicator changes the visual indicator or is displayed after the visual indicator is removed.

19. The computer-readable storage medium of claim 18, wherein the display of the visual indicator comprises a border configured to graphically highlight the one or more of the plurality of cells affected by the operation.

20. The computer-readable storage medium of claim 18, wherein the display of the visual indicator comprises a shading of the one or more of the plurality of cells affected by the operation.

* * * * *